T. L. GREEN.
BISCUIT CUTTING AND EMBOSSING MACHINE.
APPLICATION FILED AUG. 25, 1914.
1,292,311.
Patented Jan. 21, 1919.
22 SHEETS—SHEET 1.
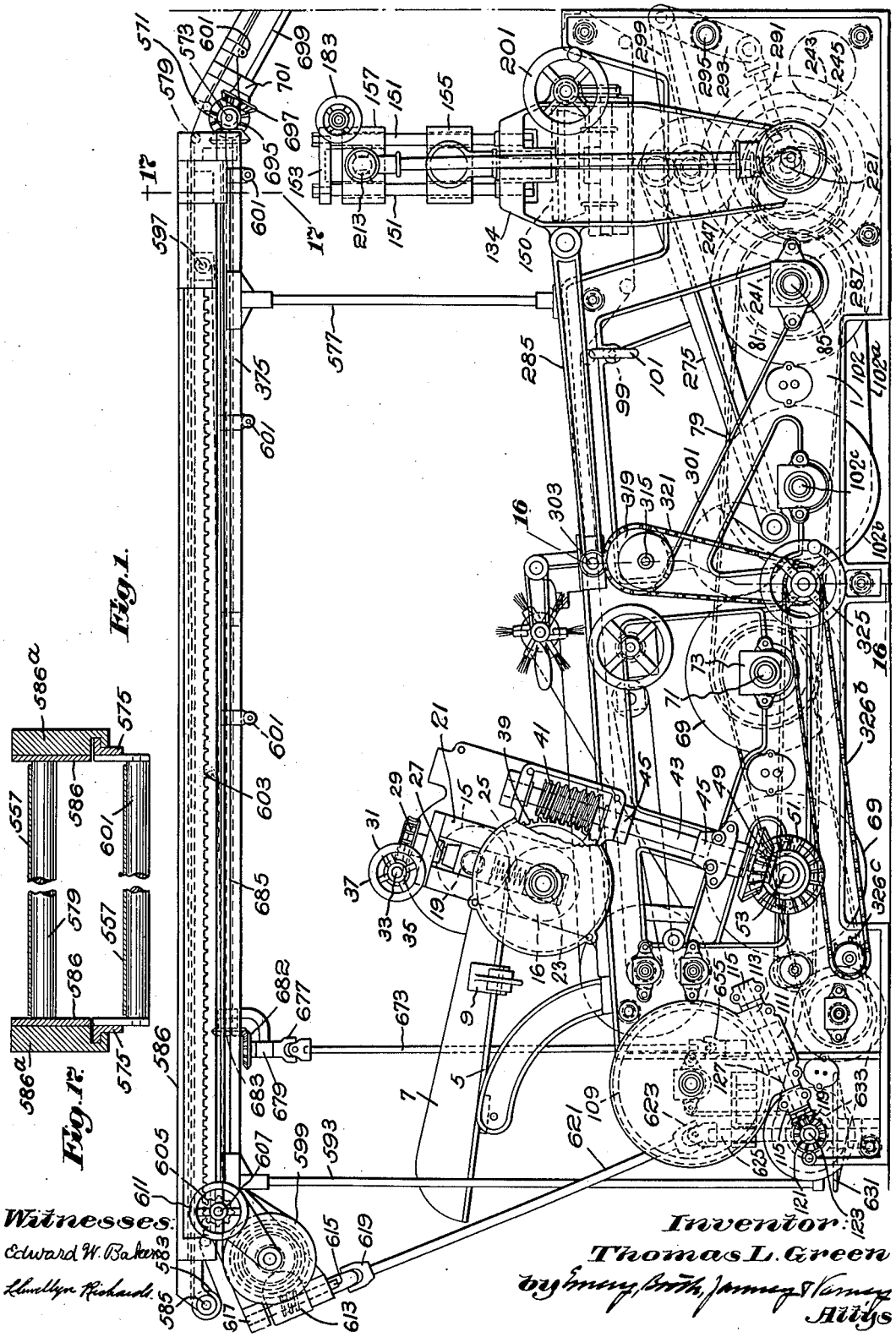
Witnesses
Edward W. Baker
Llewellyn Richards
Inventor
Thomas L. Green
by Emery, Booth, Janney & Varney
Attys

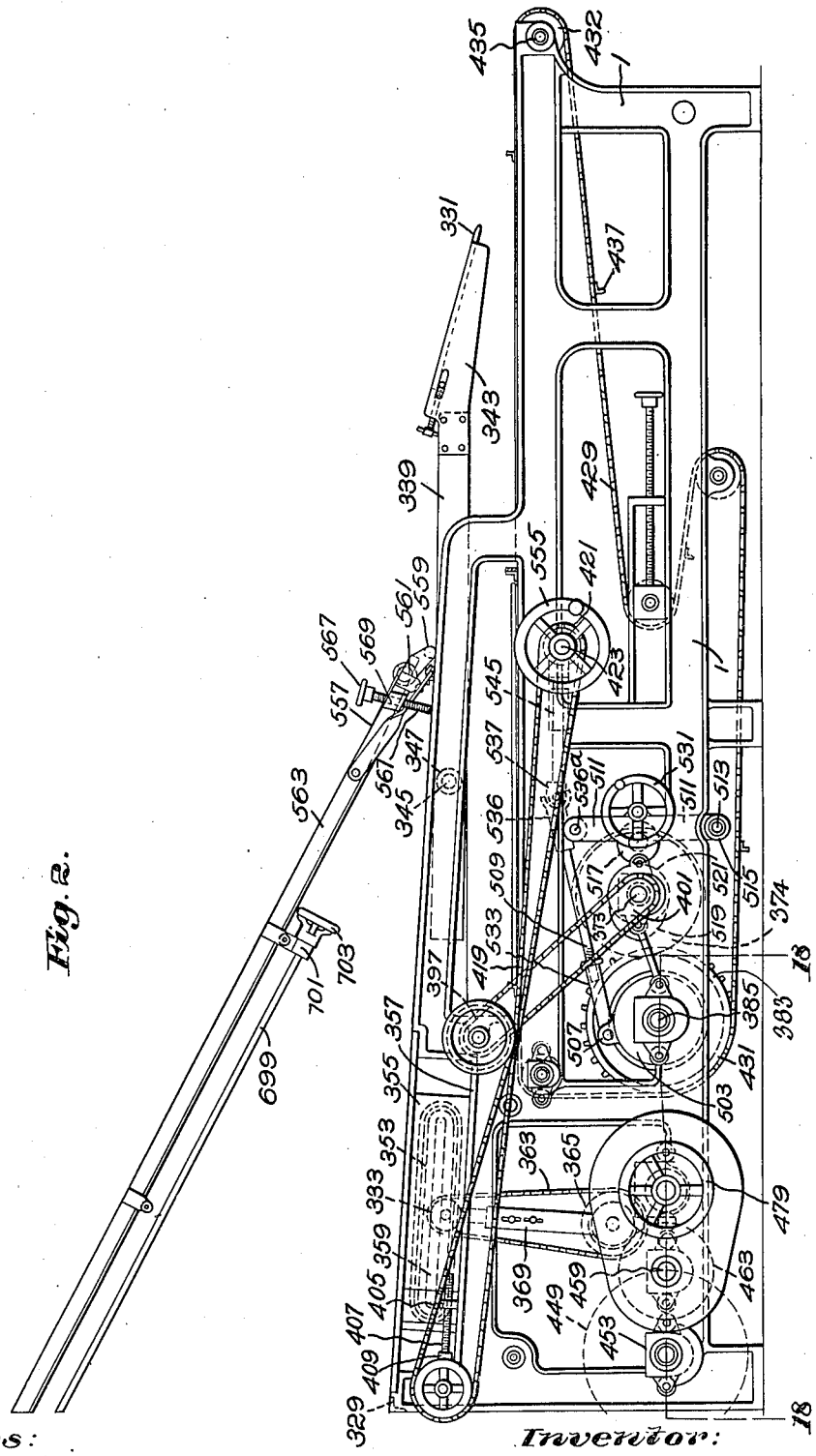

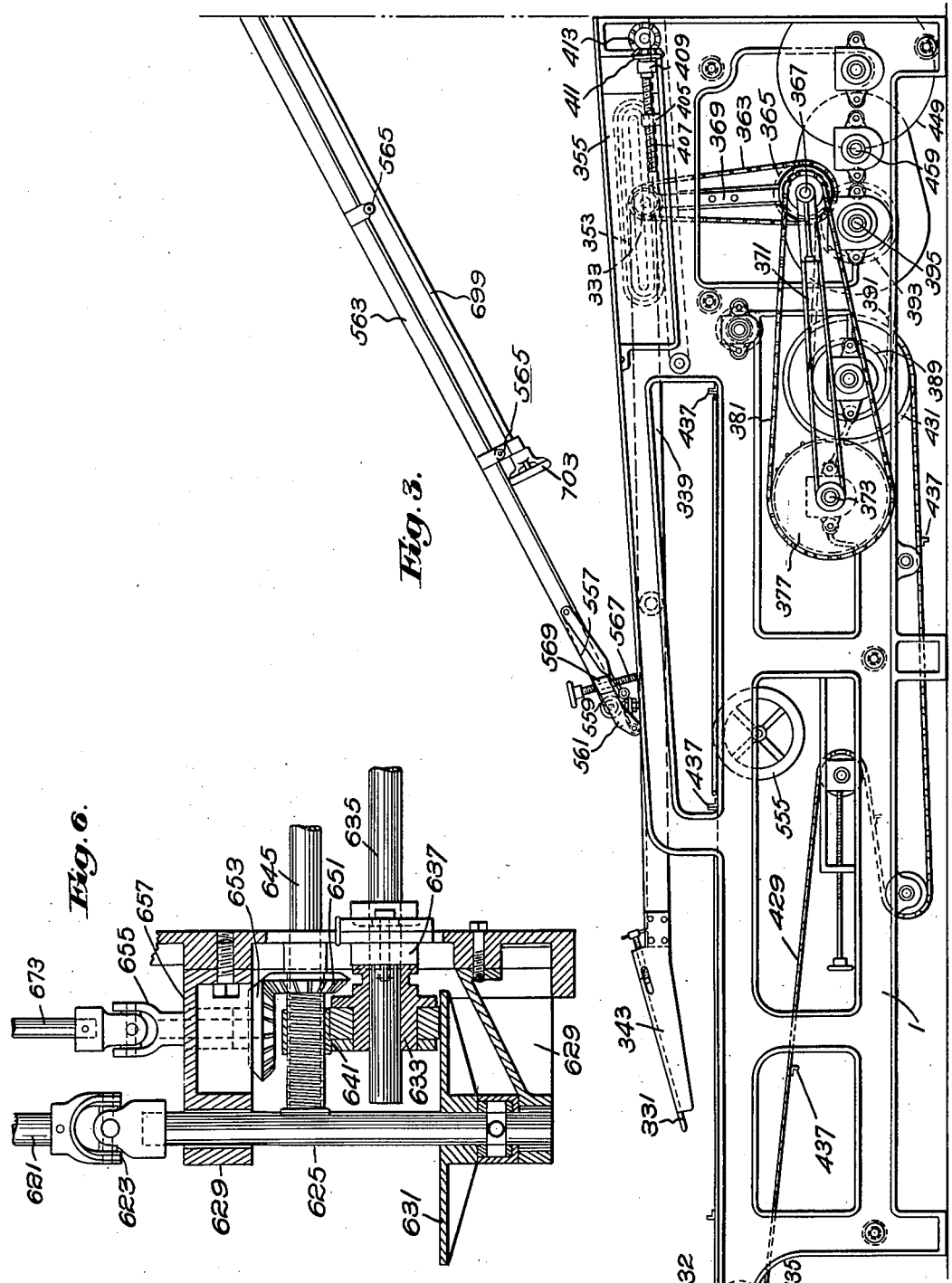
T. L. GREEN.
BISCUIT CUTTING AND EMBOSSING MACHINE.
APPLICATION FILED AUG. 25, 1914.
1,292,311. Patented Jan. 21, 1919.
22 SHEETS—SHEET 3.

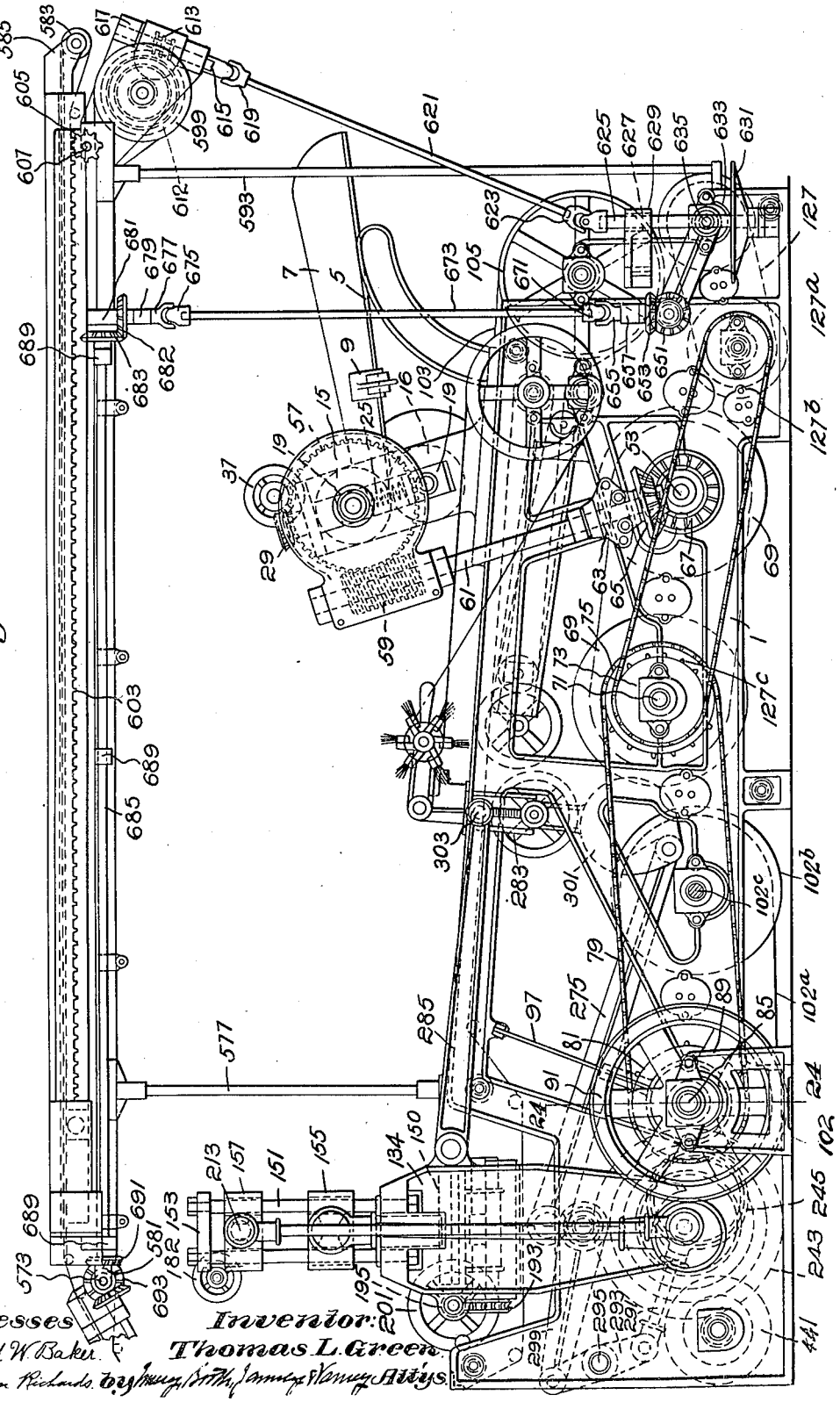

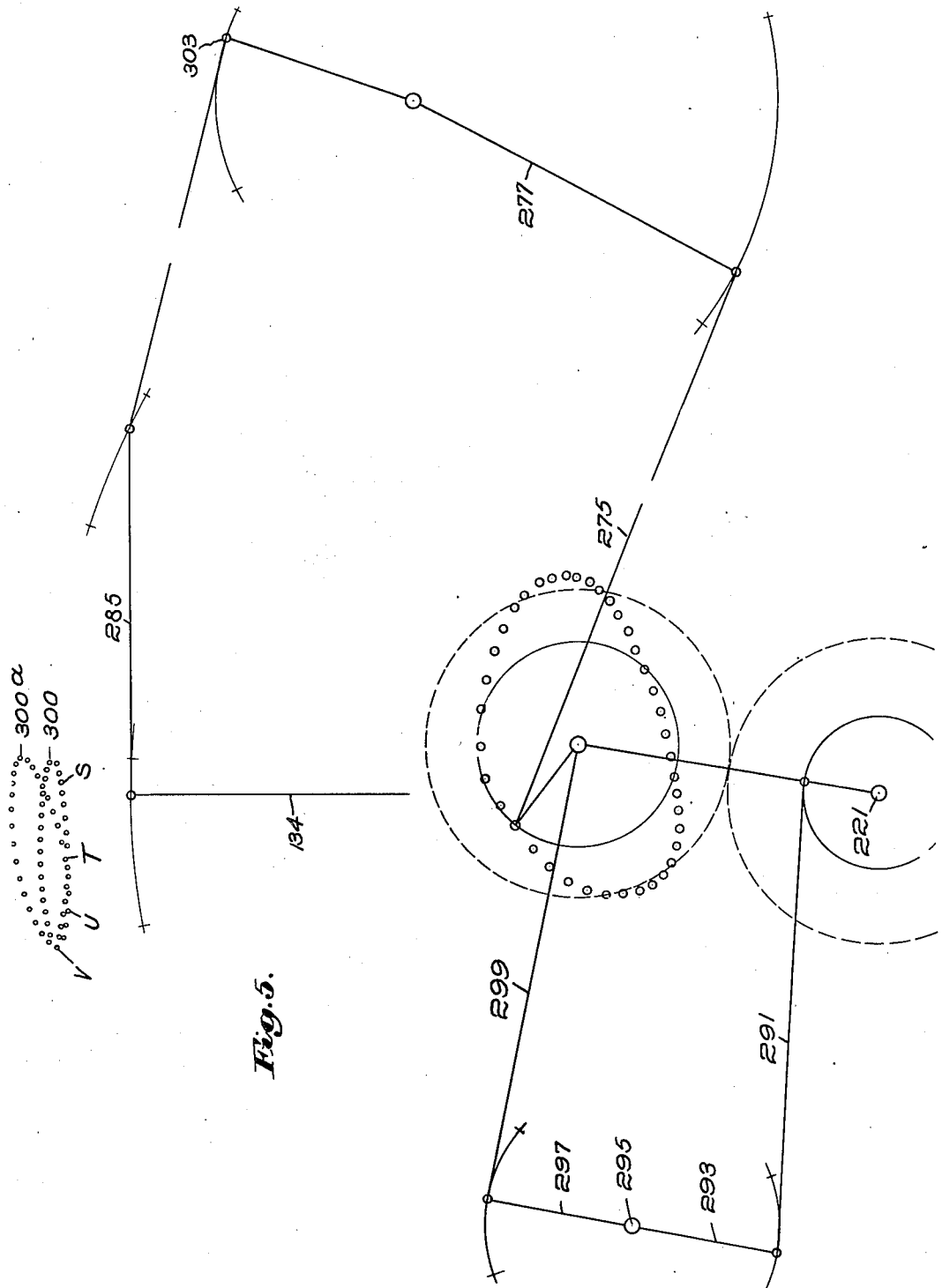

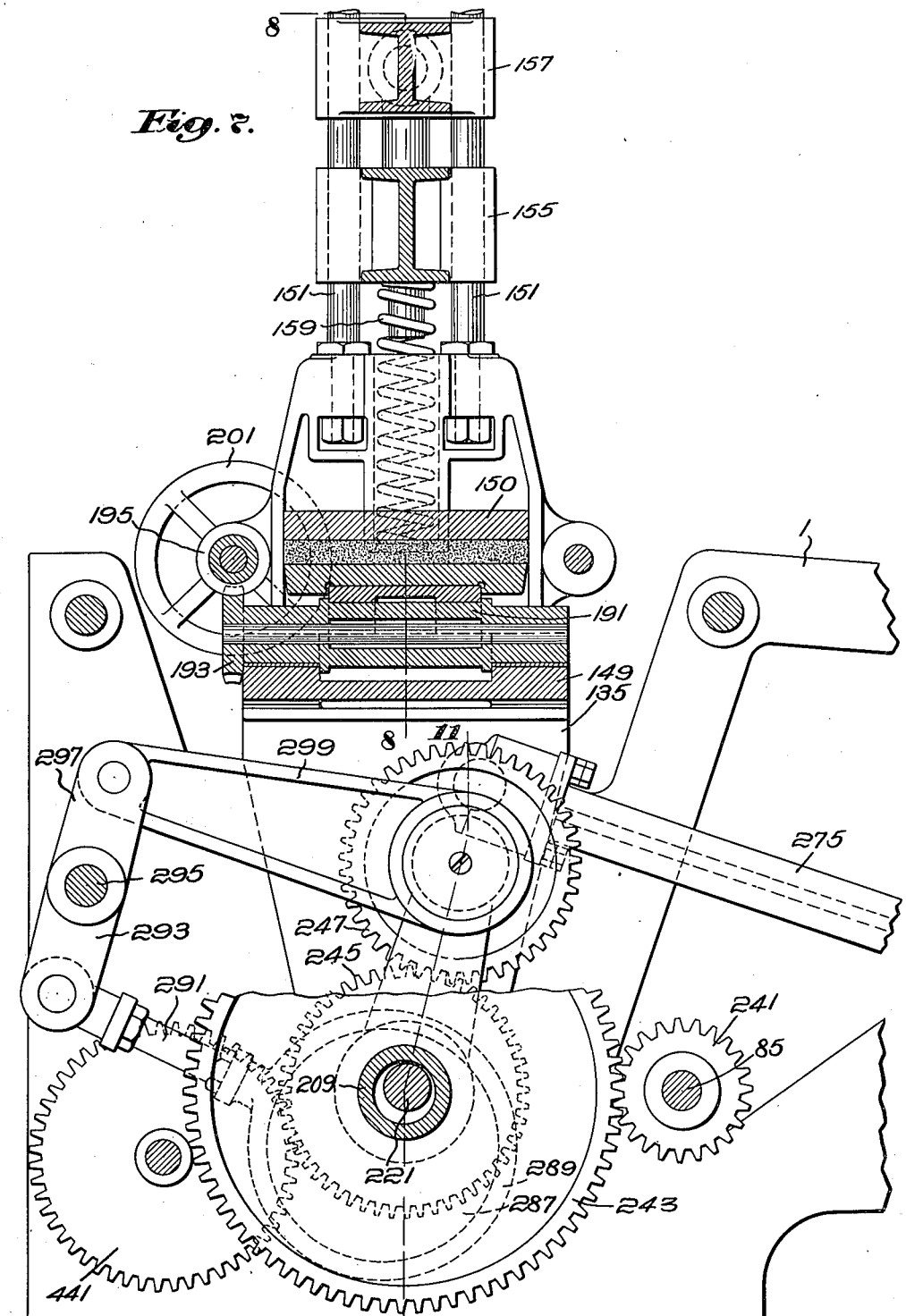

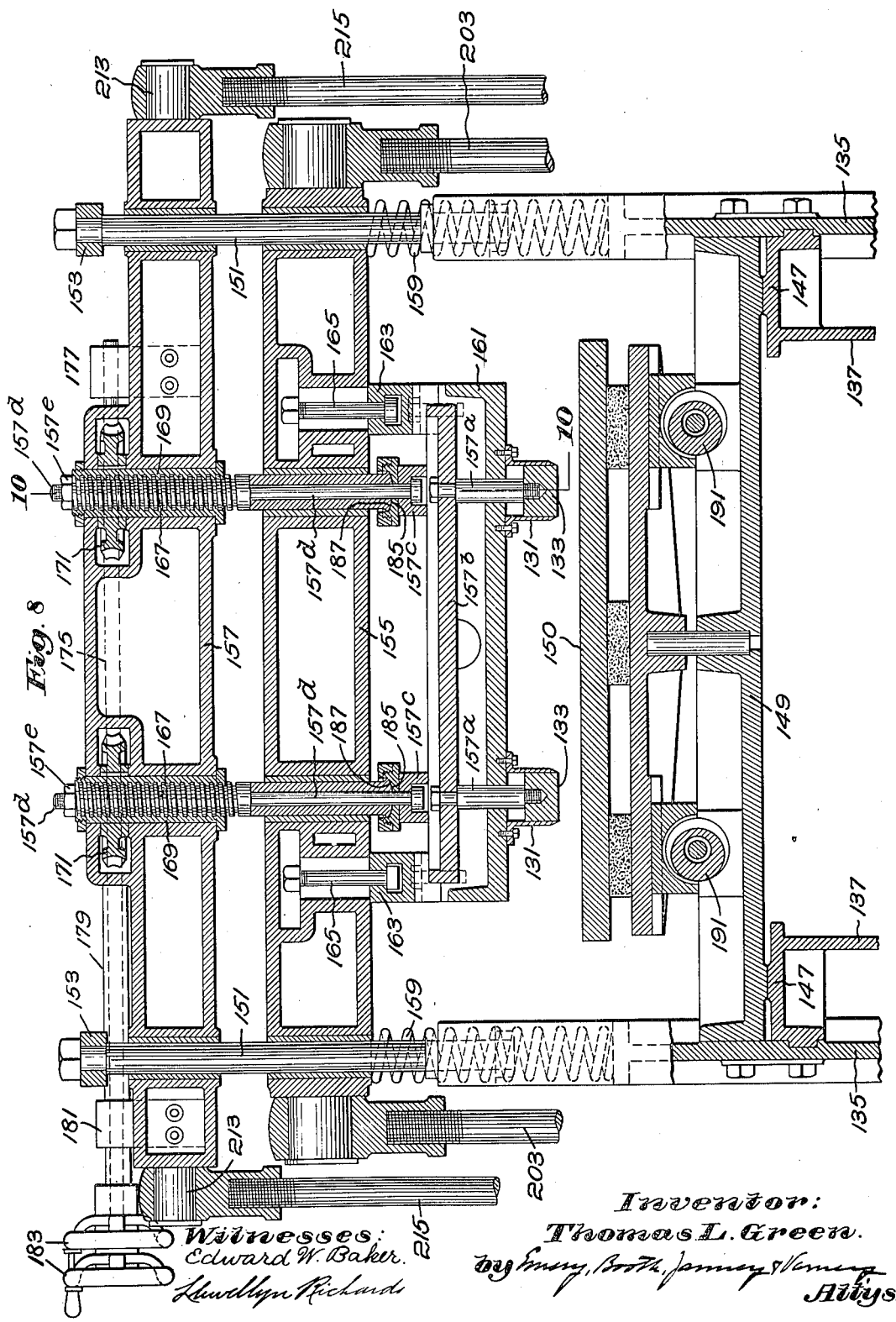

T. L. GREEN.
BISCUIT CUTTING AND EMBOSSING MACHINE.
APPLICATION FILED AUG. 25, 1914.
1,292,311.
Patented Jan. 21, 1919.
22 SHEETS—SHEET 8.
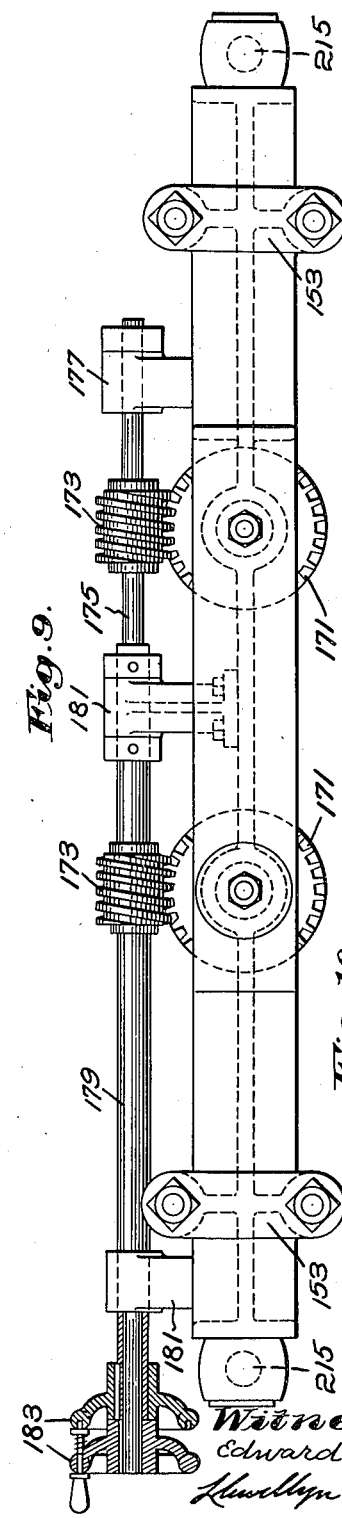
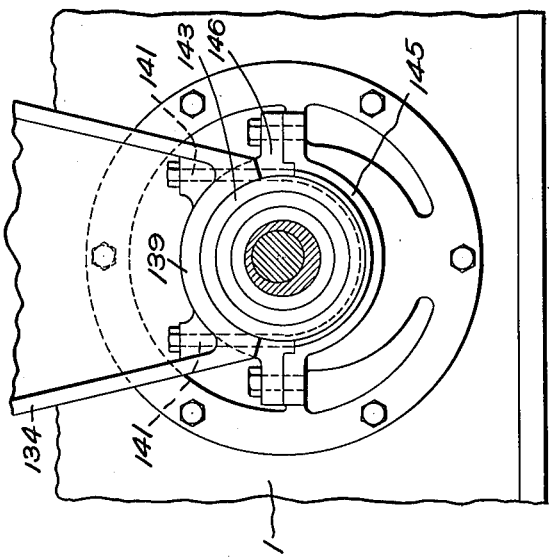
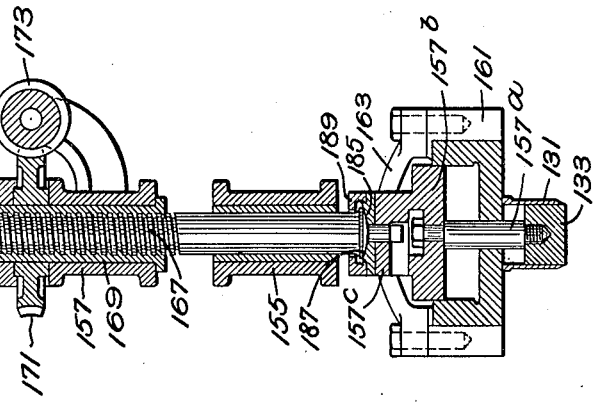
*Witnesses:*
Edward W. Baker.
Llewellyn Richards.
*Inventor:*
Thomas L. Green.
by Emery, Booth, Janney & Varney
Att'ys

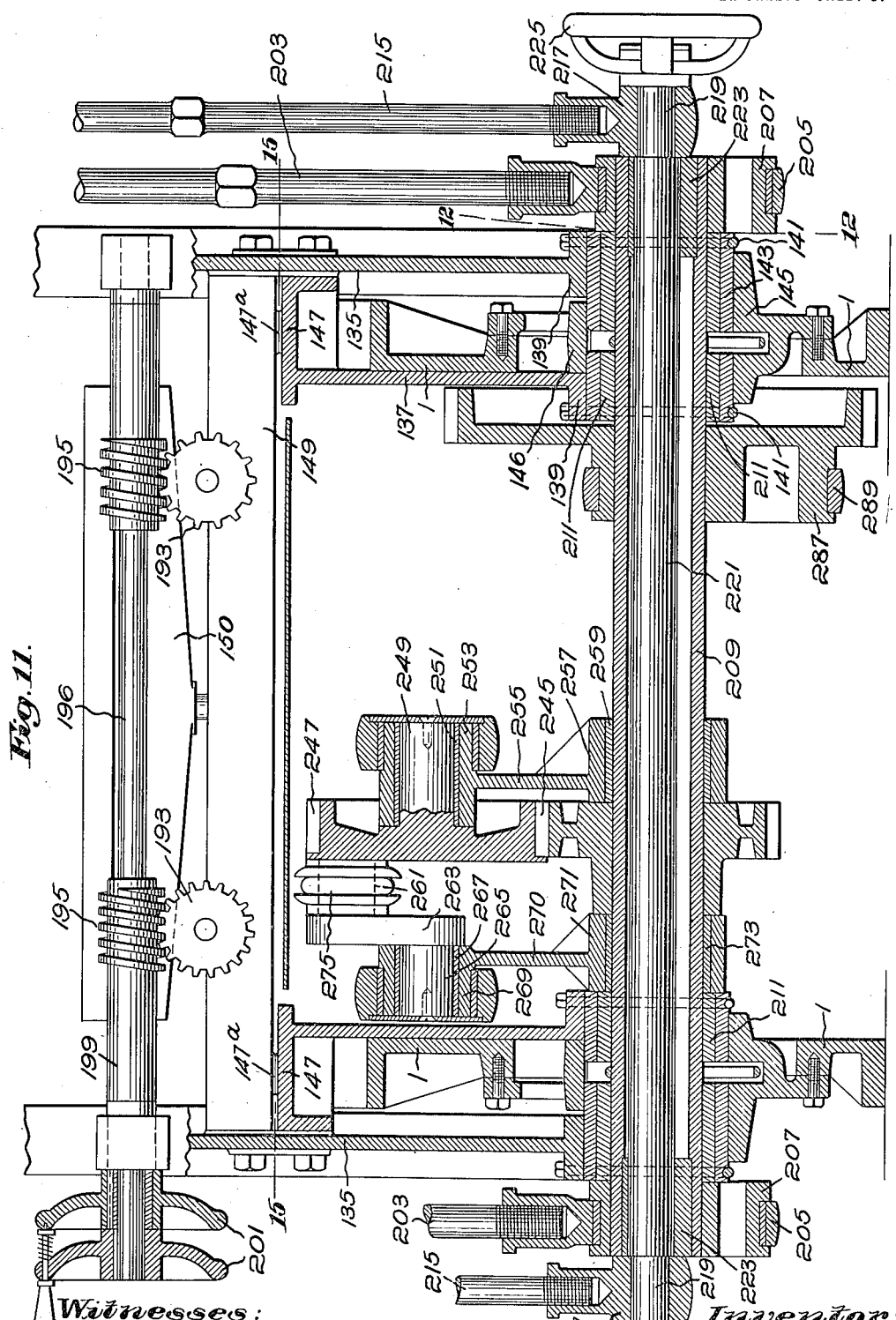

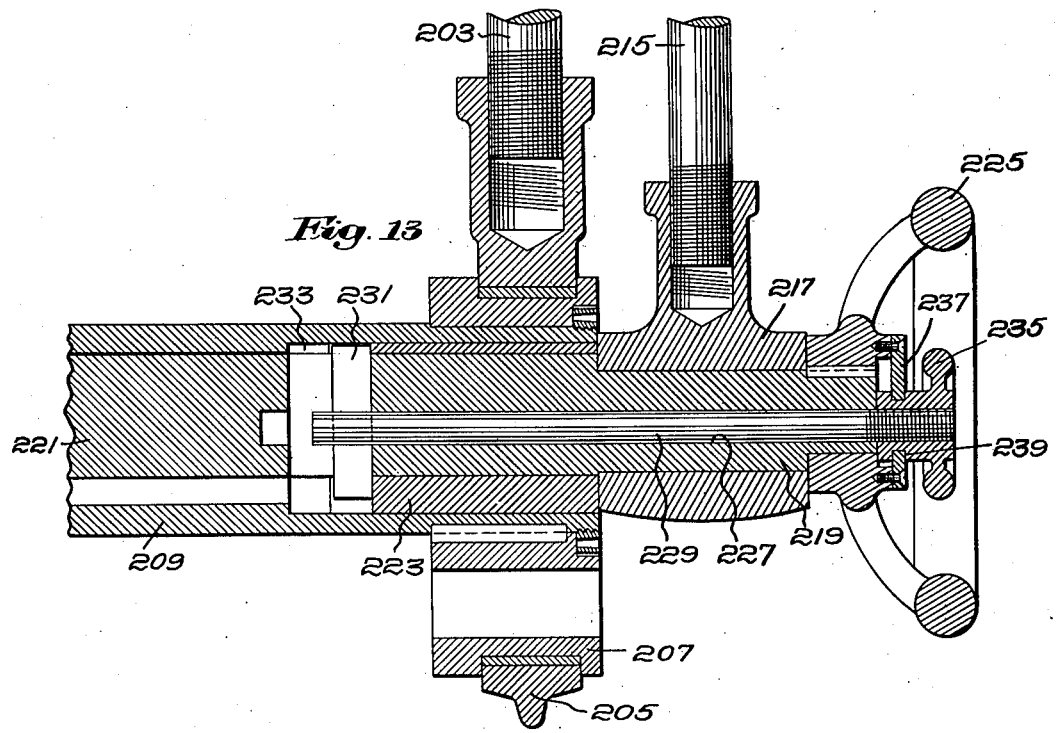
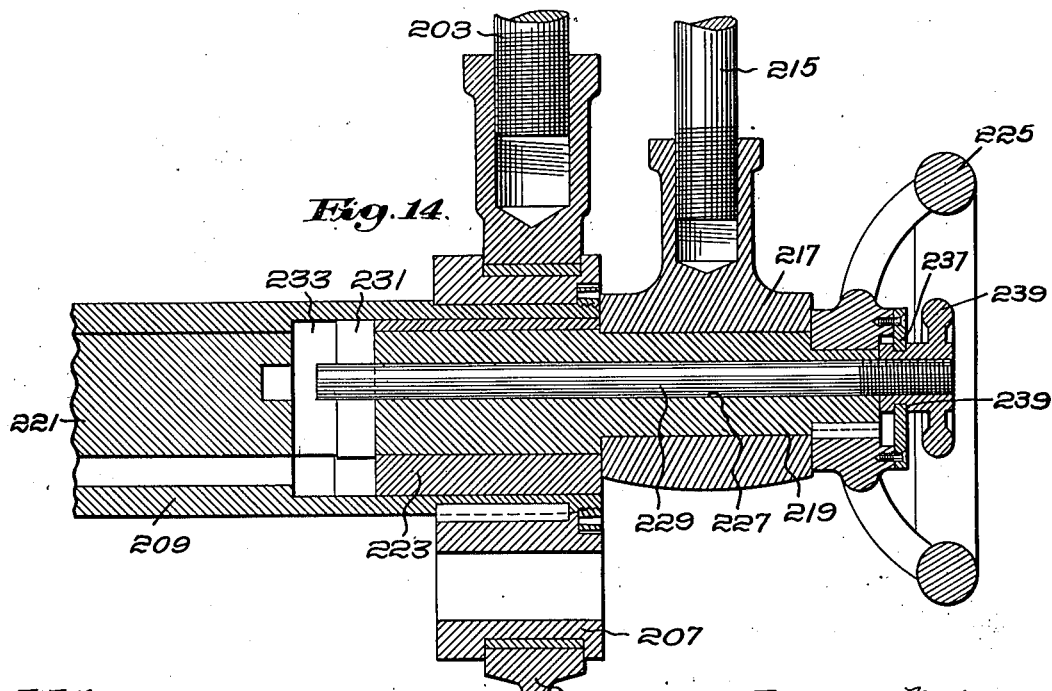

T. L. GREEN.
BISCUIT CUTTING AND EMBOSSING MACHINE.
APPLICATION FILED AUG. 25, 1914.
1,292,311. Patented Jan. 21, 1919.
22 SHEETS—SHEET 11.
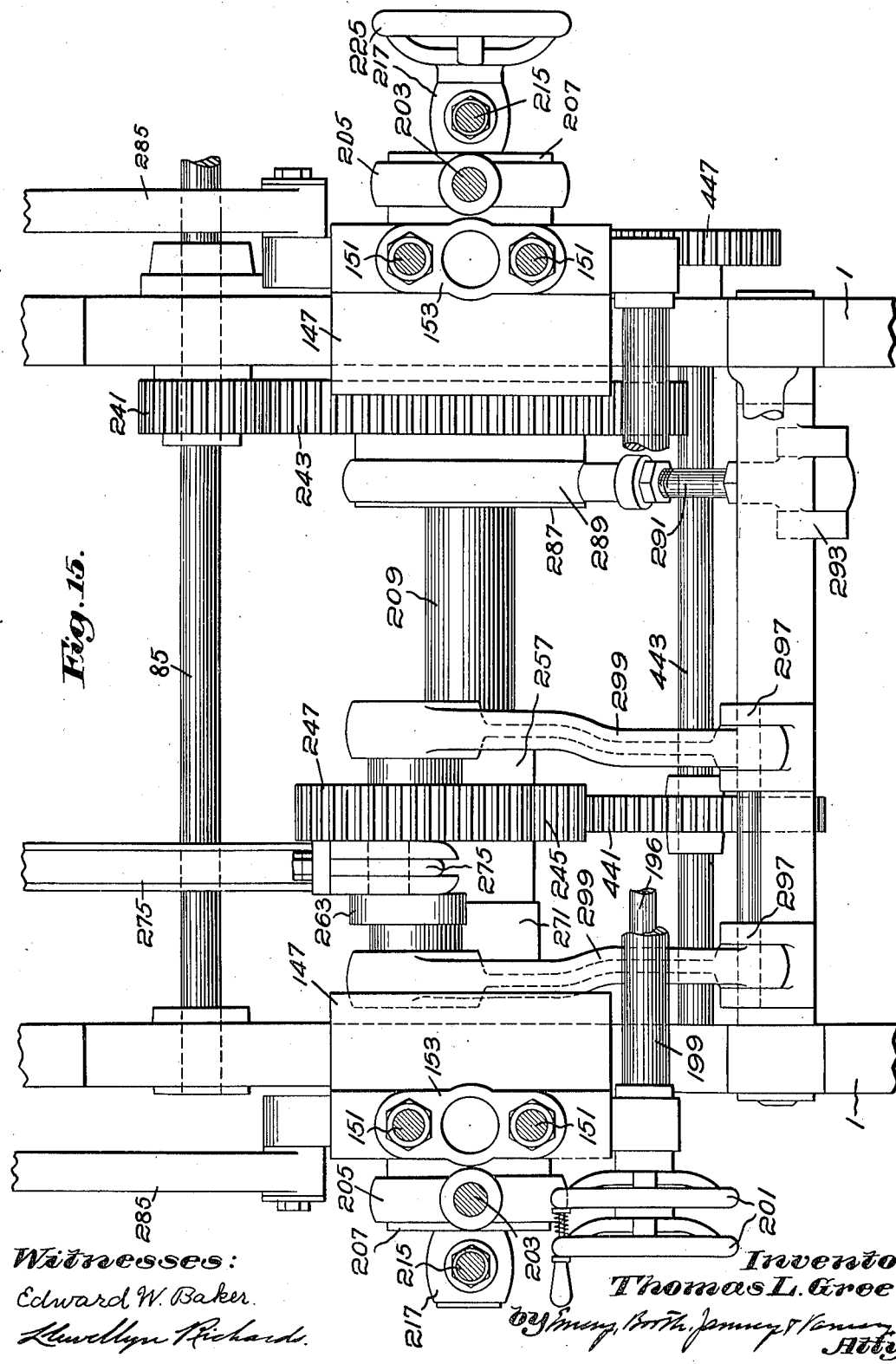
Witnesses:
Edward W. Baker.
Llewellyn Richard.
Inventor.
Thomas L. Green
Attys

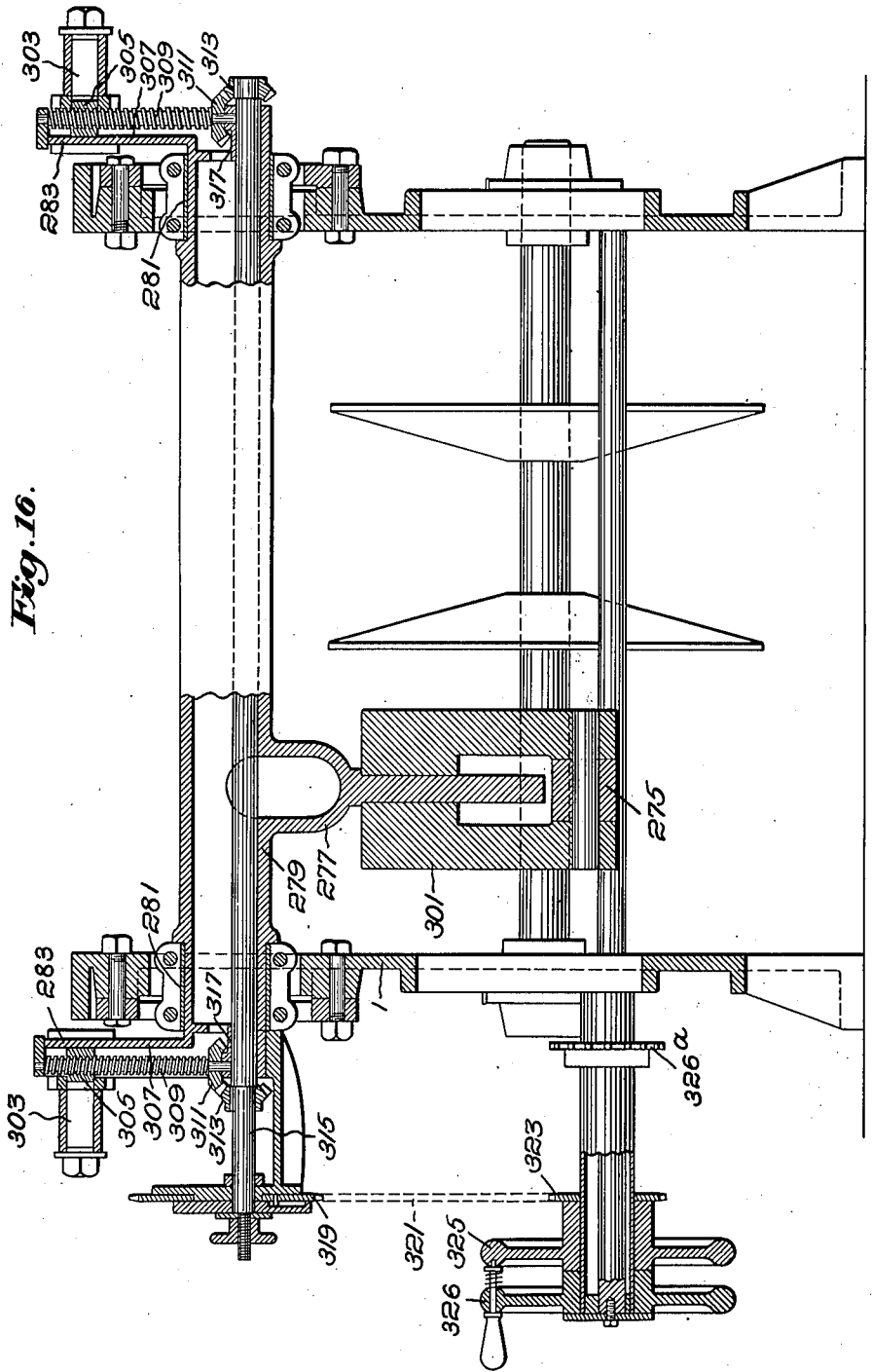

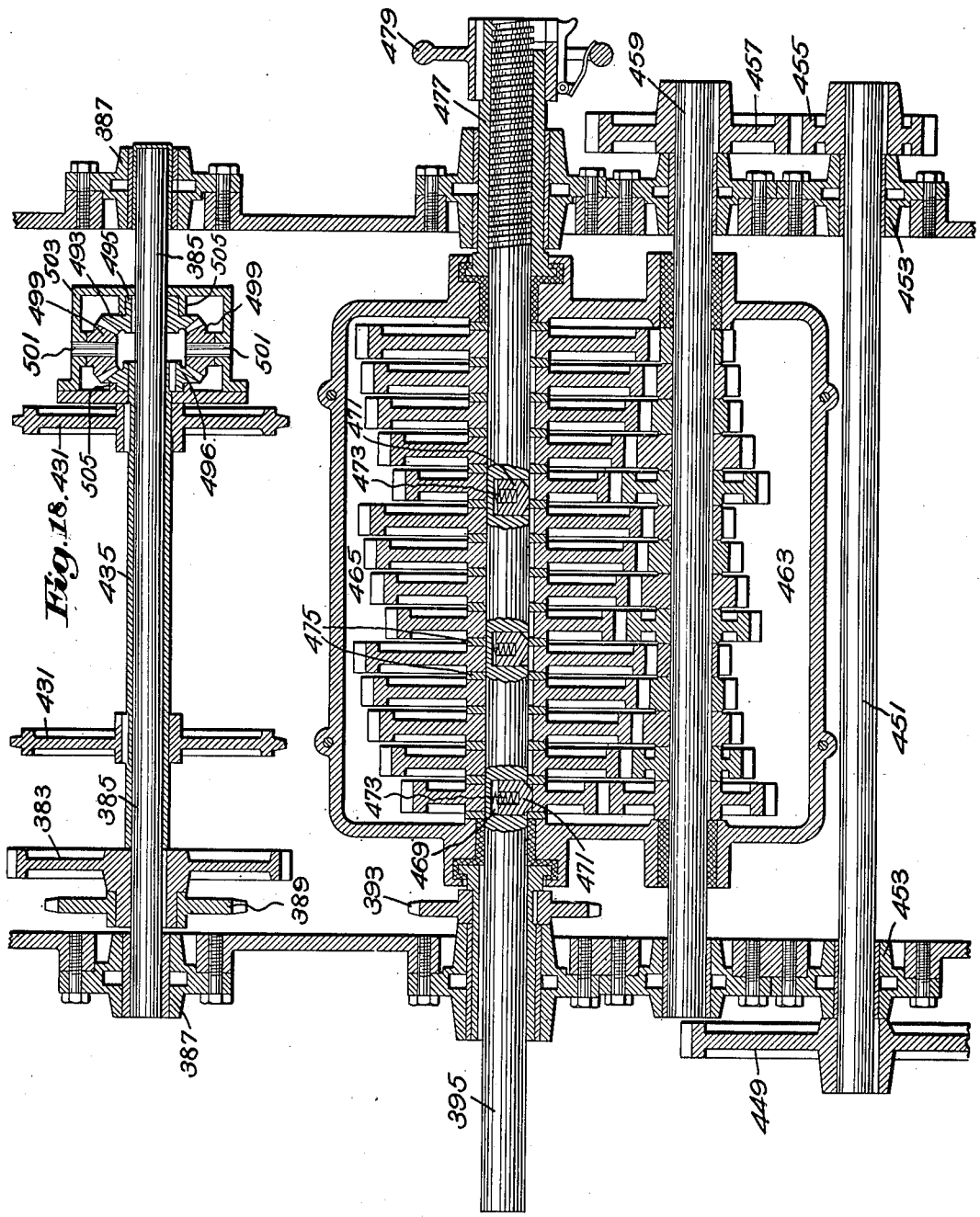

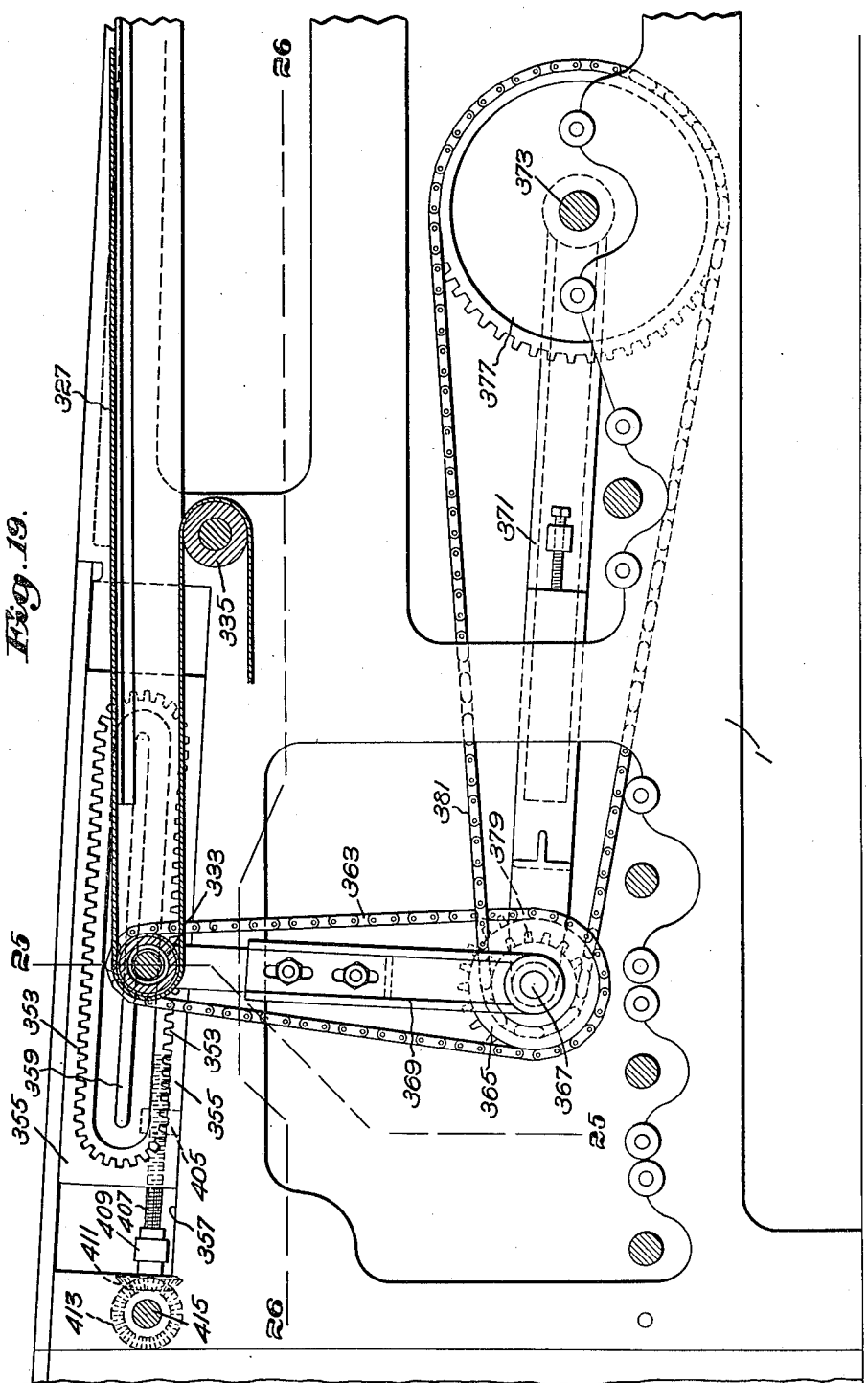

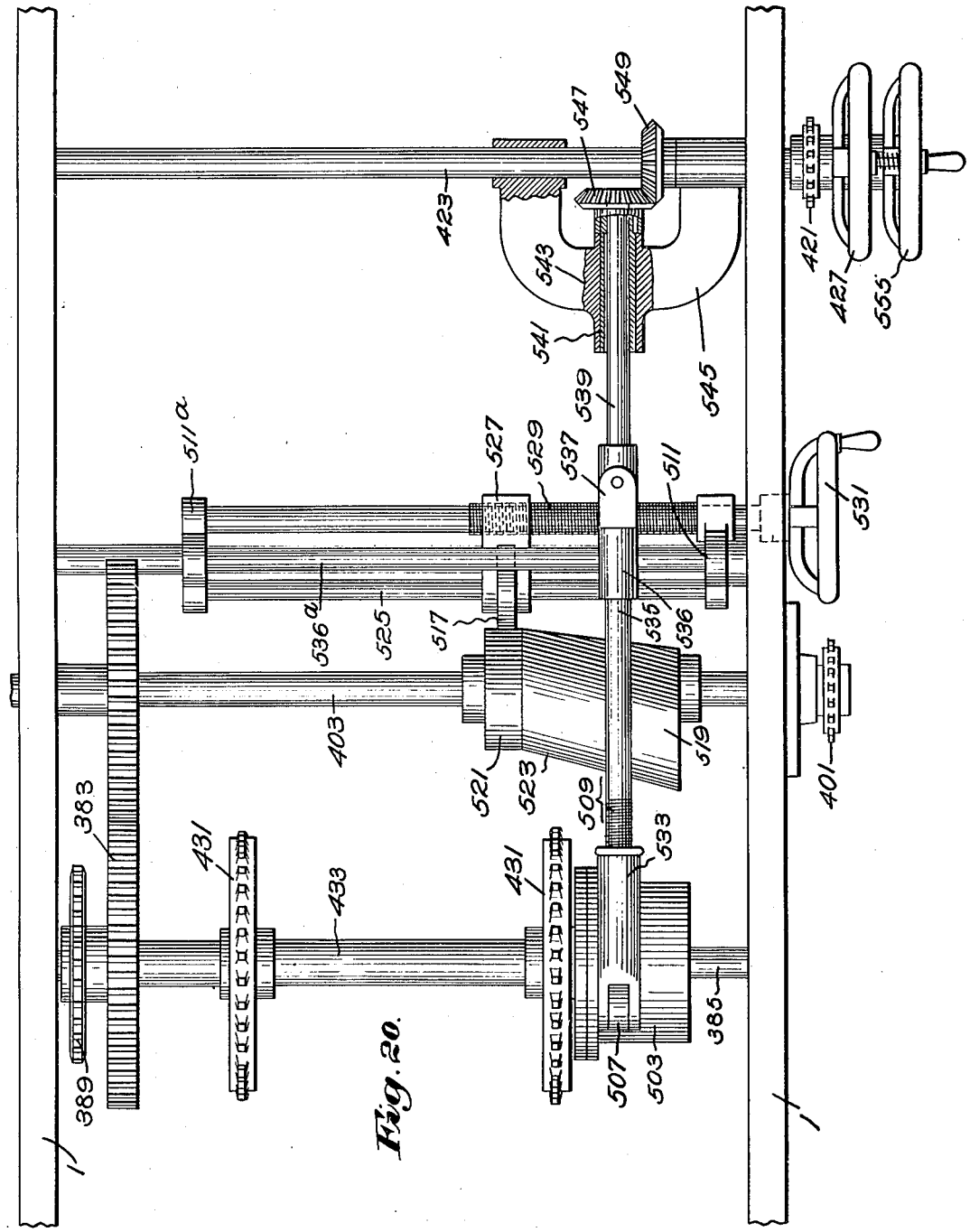

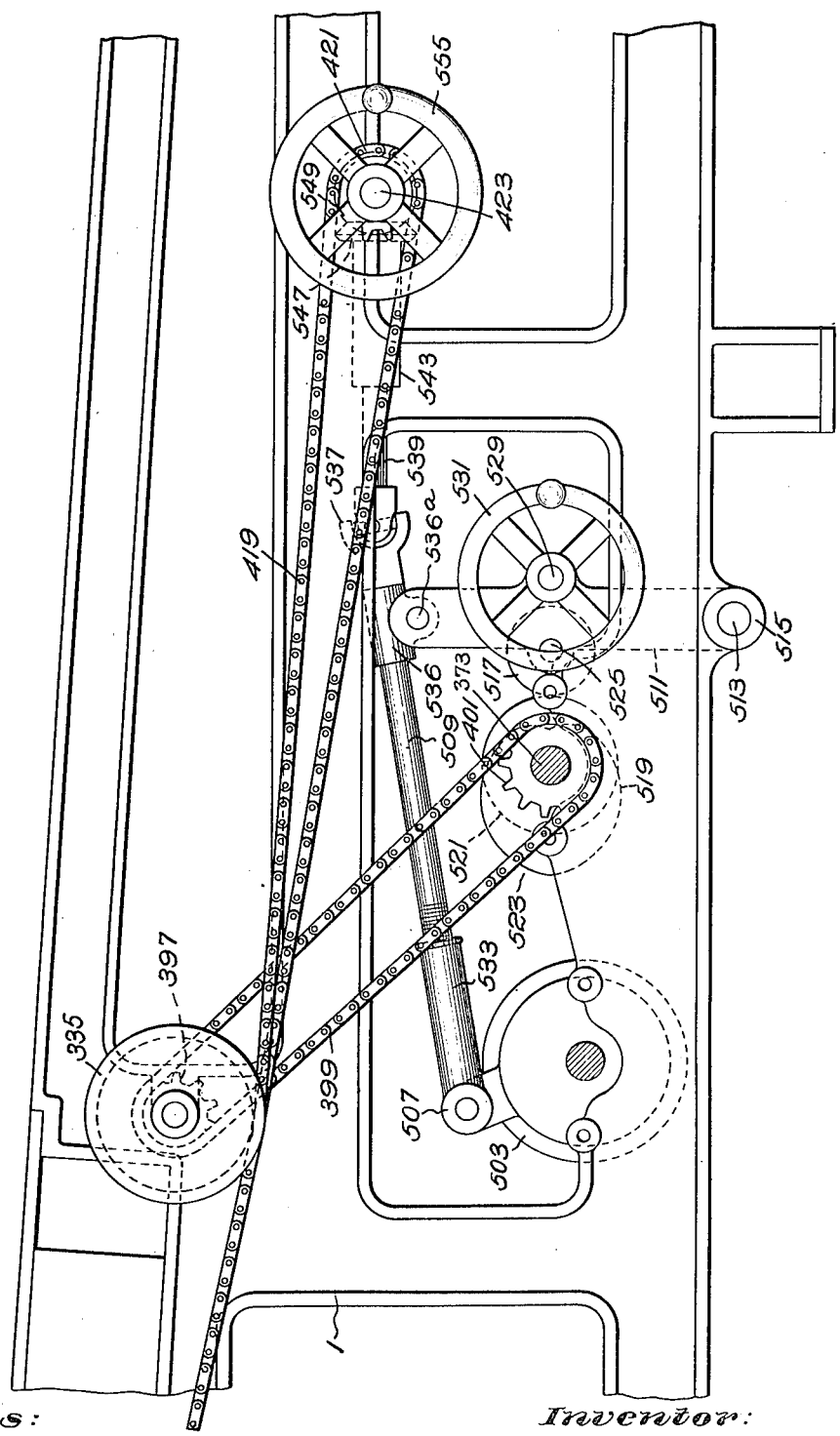

T. L. GREEN.
BISCUIT CUTTING AND EMBOSSING MACHINE.
APPLICATION FILED AUG. 25, 1914.
1,292,311. Patented Jan. 21, 1919.
22 SHEETS—SHEET 17.
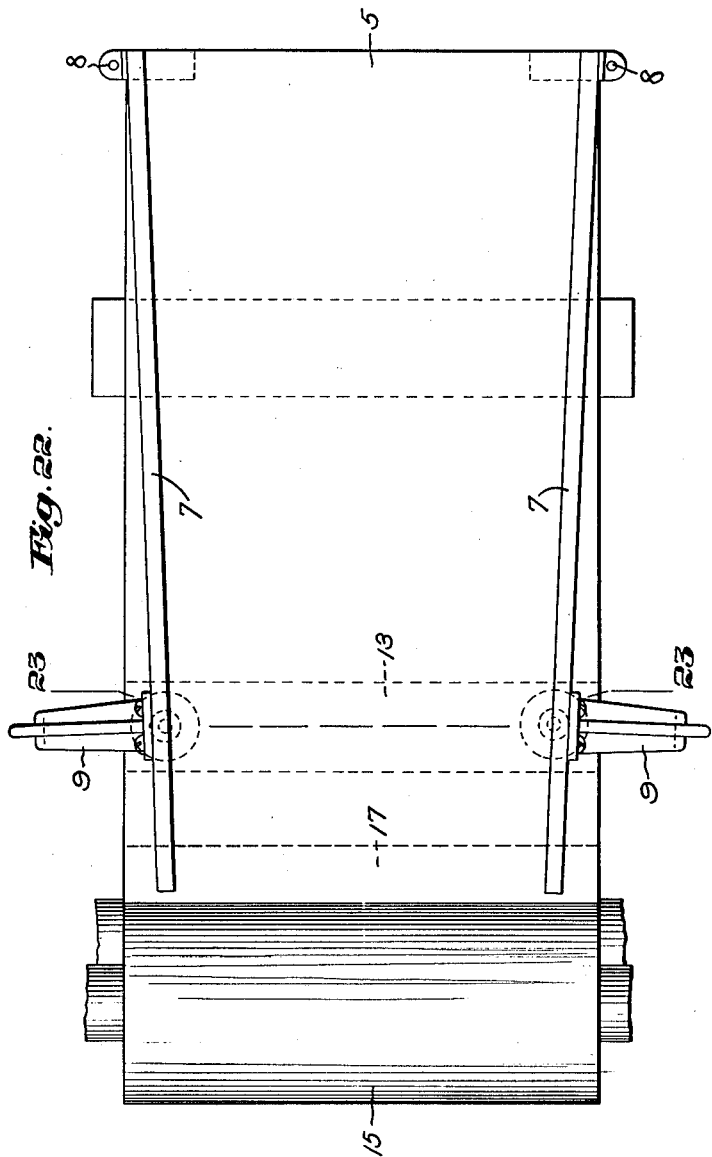
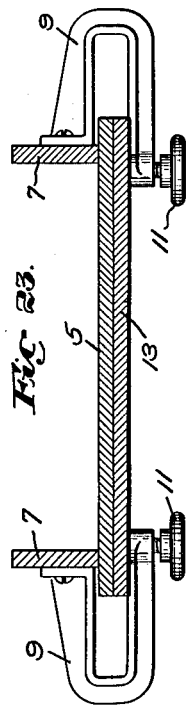

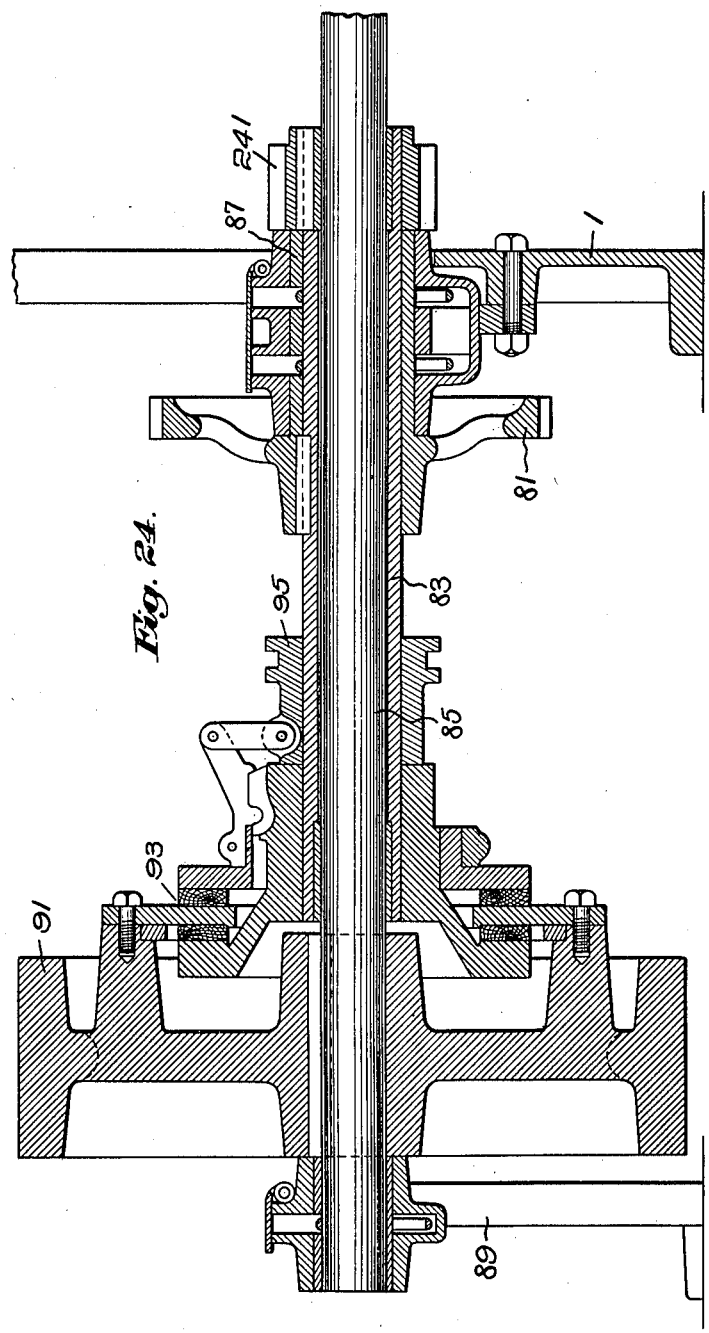

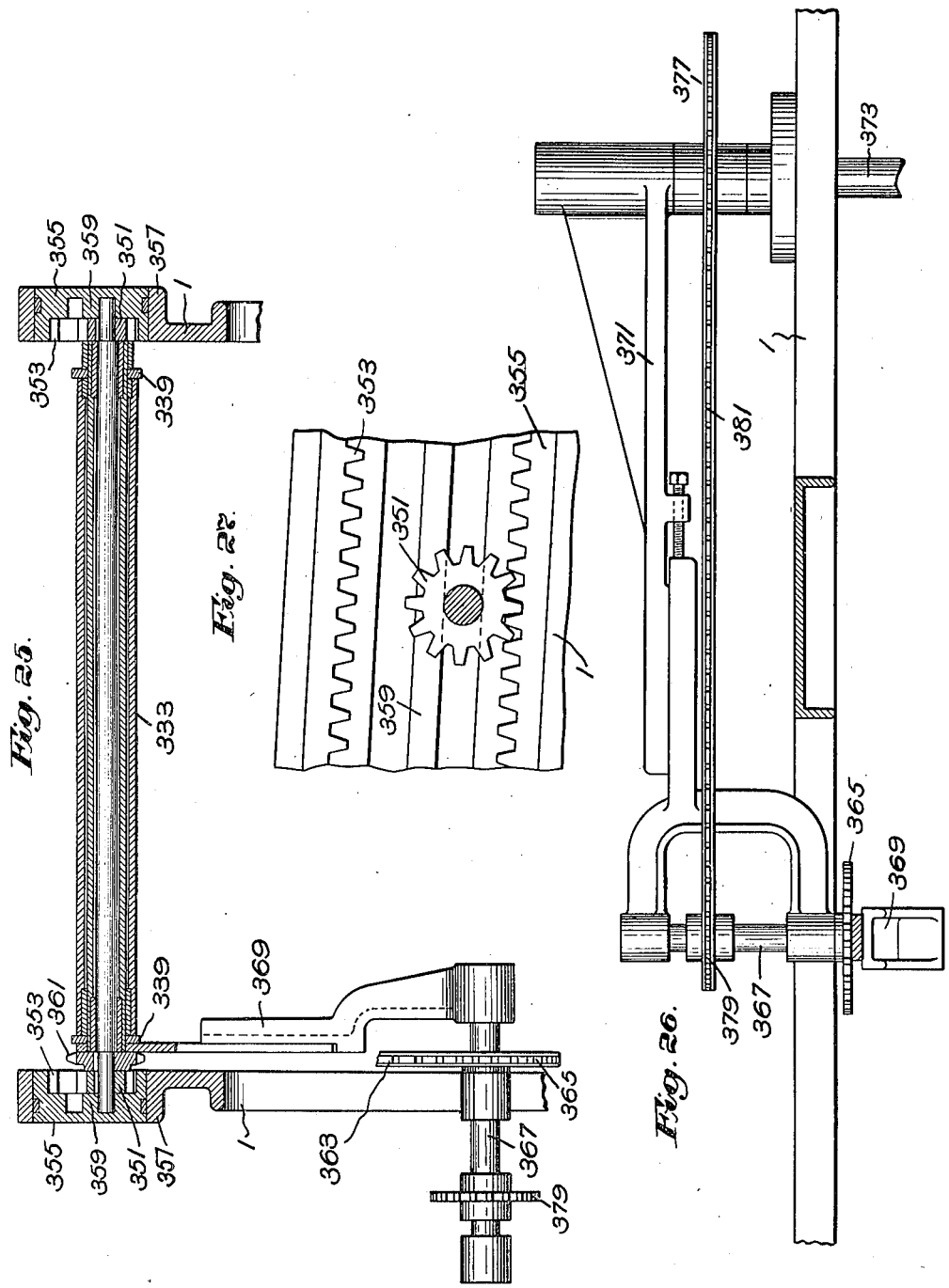

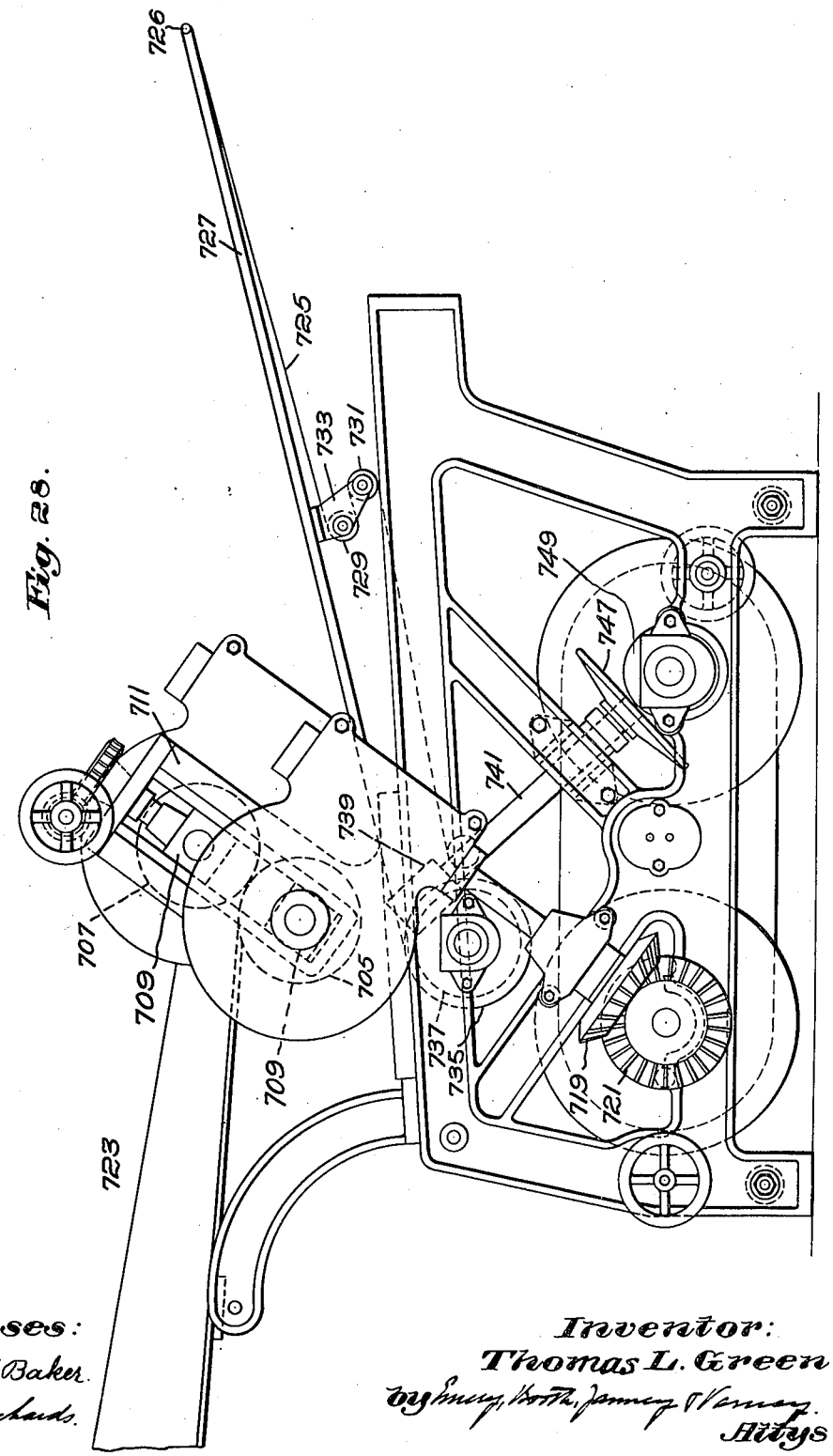

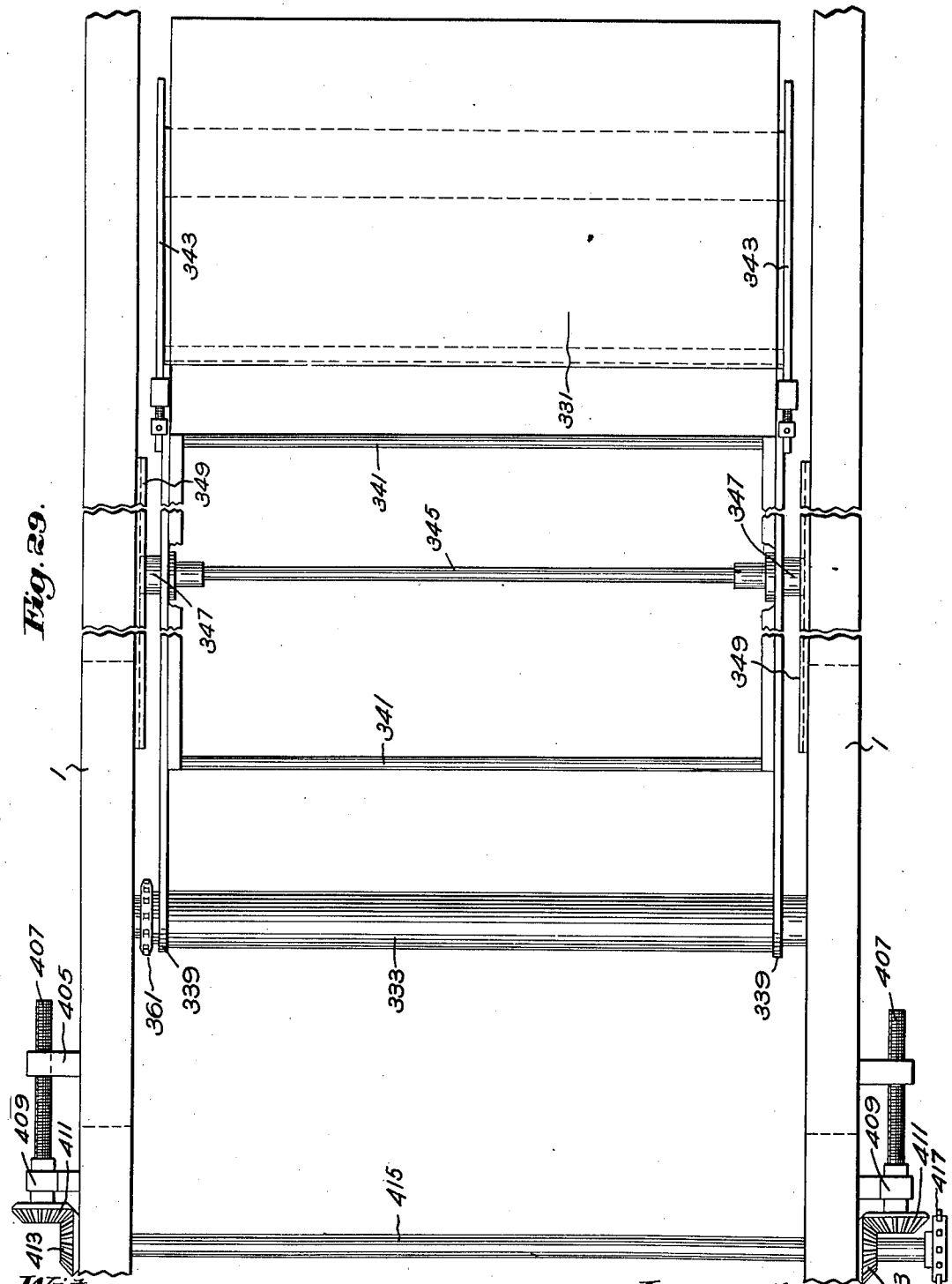

T. L. GREEN.
BISCUIT CUTTING AND EMBOSSING MACHINE.
APPLICATION FILED AUG. 25, 1914.
1,292,311.
Patented Jan. 21, 1919.
22 SHEETS—SHEET 22.
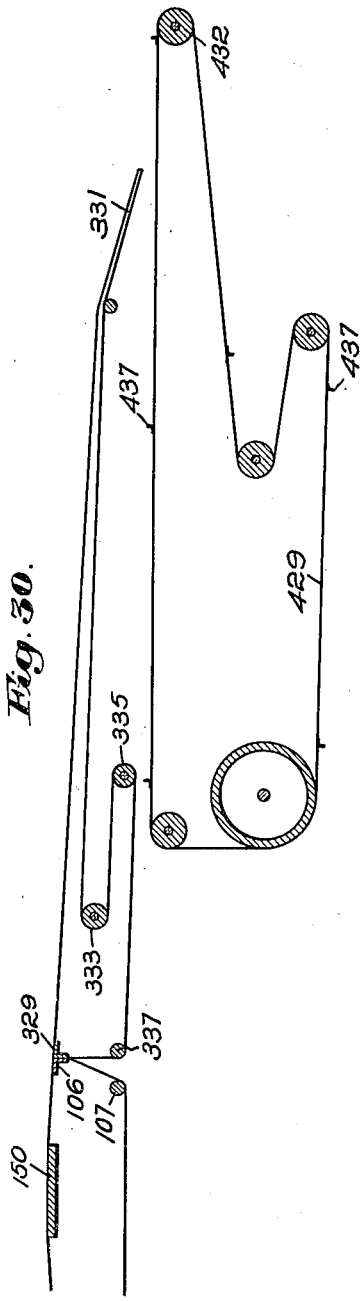
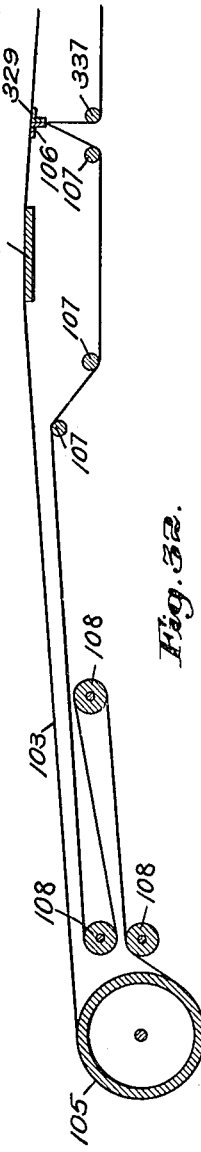
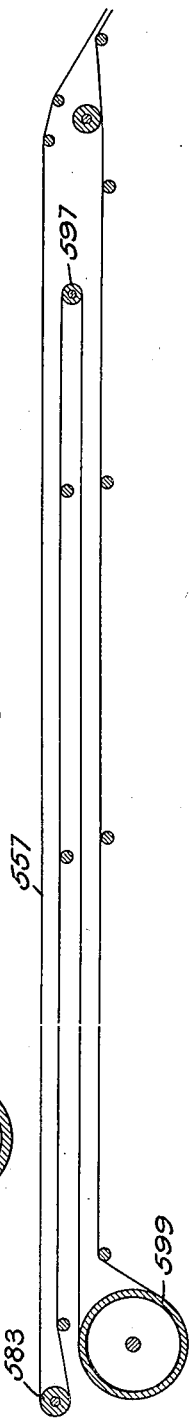
Witnesses:
Edward W. Baker.
Llewellyn Richards.
Inventor:
Thomas L. Green.
Attys

UNITED STATES PATENT OFFICE.

THOMAS L. GREEN, OF INDIANAPOLIS, INDIANA.

BISCUIT CUTTING AND EMBOSSING MACHINE.

1,292,311.  Specification of Letters Patent.  Patented Jan. 21, 1919.

Application filed August 25, 1914. Serial No. 858,507.

*To all whom it may concern:*

Be it known that I, THOMAS L. GREEN, a citizen of the United States, and a resident of Indianapolis, Indiana, have invented an Improvement in Biscuit Cutting and Embossing Machines, of which the following description, in connection with the accompanying drawings, is a specification, like characters on the drawings representing like parts.

This invention relates to biscuit and other machines, and among other objects aims to provide a mechanism whereby biscuits may be cut, or cut and embossed, rapidly and perfectly from a sheet of dough and be delivered to pans in readiness for baking.

The character of the invention may be best understood by reference to the following description of an illustrative embodiment thereof shown in the accompanying drawings, wherein:

Figures 1 and 2 taken together show a side elevation of the illustrative biscuit cutting and embossing machine shown herein as embodying the invention;

Figs. 3 and 4 taken together show in elevation the opposite side of the machine shown in Figs. 1 and 2;

Fig. 5 is a diagrammatic view showing the orbits of the cutter and embosser in their combined movement of vertical and horizontal reciprocation;

Fig. 6 is a vertical section through a part of the driving mechanism for the scrap apron shown in Fig. 4;

Fig. 7 is a view partly in side elevation and partly in section of the biscuit cutter and embosser carrying frame and showing a portion of a mechanism for oscillating said frame;

Fig. 8 is a vertical section taken on line 8—8 of Fig. 7;

Fig. 9 is a plan of the cutter and embosser carrying frame shown in Figs. 7 and 8;

Fig. 10 is a section taken on line 10—10 of Fig. 8;

Fig. 11 is a vertical transverse section taken on line 11—11 of Fig. 7;

Fig. 12 is a section taken on line 12—12 of Fig. 11;

Fig. 13 on an enlarged scale is a sectional detail of parts shown in Fig. 11 disclosing the mechanism for adjusting the embosser into or out of operative position for rendering the embosser effective;

Fig. 14 is a view similar to Fig. 13 showing the parts in position for rendering the embosser effective;

Fig. 15 is a horizontal section taken on line 15—15 of Fig. 11 with the cutters, embossers and bed plate removed to disclose the mechanism for oscillating the frame located beneath the bed plate;

Fig. 16 on an enlarged scale is a section taken on line 16—16 of Fig. 1;

Fig. 17 is a transverse section taken on line 17—17 of Fig. 1;

Fig. 18 on an enlarged scale is a horizontal section taken on line 18—18 of Fig. 2 showing a part of the transmisison mechanism for driving the pan carrier including different speed change gears, a casing therefor, and a differential gear mechanism;

Fig. 19 on an enlarged scale is a side elevation of mechanism shown in Fig. 2 for reciprocating the panner blade for alternately shortening and lengthening the delivery apron to deposit biscuits therefrom to pans on the pan carrier;

Fig. 20 is a plan showing the driving mechanism for the pan carrier including the differential and cam devices;

Fig. 21 is a side elevation of a portion of the machine showing part of the pan carrier driving mechanism;

Fig. 22 is a plan of the trough for feeding the dough to the gage rolls;

Fig. 23 is a section taken on line 23—23 of Fig. 22;

Fig. 24 is a vertical section taken on line 24—24 of Fig. 4 showing the fly wheel, friction clutch and driving wheels from which the mechanism at the opposite ends of the machine is driven;

Fig. 25 is a vertical section taken on line 25—25 of Fig. 19;

Fig. 26 is a horizontal section taken on line 26—26 of Fig. 19;

Fig. 27 is a detail of a portion of the rack and pinion mechanism for reciprocating the panner blade frame;

Fig. 28 is a side elevation of the supplemental gage rolls and the apron coöperating therewith;

Fig. 29 is a plan of the frame carrying the roller and panner blade for the delivery apron;

Figs. 30 and 31 are diagrams showing the main apron, the delivery apron and the pan carrier; and Fig. 32 is a diagram showing the disposition of the scrap apron.

Referring to the drawings and to the embodiment of the invention which is there shown for illustrative purposes, a more ready understanding of the same may be obtained by the following general outline of the functions of the machine.

The dough is placed upon a trough and fed between gage rolls which flatten the same into the form of a sheet. This sheet is then conducted by a continuously driven main apron to and through a frame carrying embossers and cutters which are reciprocated vertically toward and from the sheet. The frame is oscillated to cause the embossers and cutters to travel in unison with the apron while acting on the sheet. The biscuits thus died out are fed by the main apron to a delivery apron which conducts the biscuits to pans on an endless carrier. The pan carrier is driven continuously and means is provided for imparting one speed thereto while the biscuits are being deposited on the pans and a more rapid speed thereto during the intervals when biscuits are not being deposited in order to advance the pans sufficiently to prevent the depositing of biscuits on the ends of adjacent pans. A scrap apron is provided for conducting the scrap dough surrounding the died out biscuits back over the machine toward the feeding-in end thereof where the scrap may be delivered and mixed in with the dough which is fed into the machine. The speed of this scrap apron is conveniently controlled adjacent the delivery end of the machine.

In some cases it is desired to give the dough an extra rolling. If so, an extra pair of gage rolls may be provided adjacent the feeding-in end of the machine. The scrap apron is extensible so that it may deliver either to the first or second set of gage rolls or at any other point as desired.

The machine including the above and other instrumentalities will now be described in detail. The machine frame comprises elongated side members 1, 1 connected and held in spaced relation by transverse members. On one end of said frame is supported a trough (Figs. 1, 3, 22 and 23) comprising a bottom 5 and sides 7, 7, separate from said bottom, the outer ends of said sides being pivotally mounted as at 8 and their inner ends being adjustable toward and from one another to vary the width of the dough sheet. To accomplish this adjustment each side is provided with a U-shaped bracket 9 having one end secured to the side and its opposite end provided with a hand screw 11 adapted to be tightened against a cross bar 13 secured to and beneath the bottom of the trough. By this adjustment the width of the dough sheet may be varied as desired. The dough placed on the trough is fed to and between upper and lower gage rolls 15 and 17. The upper gage roll 15 is journaled in boxes 19 mounted in guideways in uprights 21 mounted on the frame. The lower gage roll 17 is journaled in boxes 23 also mounted in said guideways and helical springs 25 are provided tending to lift the upper roll from the lower roll. To adjust the upper roll vertically, its boxes are provided with screw shafts 27 threaded into the tops of said uprights and having worm wheels 29 splined thereon in mesh with worms 31 fast on a shaft 33 paralleling said rolls and journaled in bearings 35 on the tops of said uprights. The shaft is provided at one end thereof with a hand wheel 37. When this wheel is turned it will operate through the mechanism described and press the upper roll downward toward the lower roll or elevate the same up away from said lower roll, as desired.

To drive the lower gage roll its shaft is extended beyond one side of the machine to receive a large worm gear 39 fast on said shaft and meshing with and driven by a worm 41 fast on a shaft 43 obliquely disposed and journaled in appropriate bearings 45 projecting from the side of the machine. Fast on the lower end of this shaft is a bevel gear 49 meshing with a bevel gear 51 fast on a shaft 53 journaled in bearings in the machine frame.

The shaft of the upper gage roll is extended somewhat beyond the opposite side of the machine to receive a large worm wheel 57 fast thereon meshing with a worm 59 fast on an oblique shaft 61 journaled in bearings 63 projecting laterally from the side of the machine and having a bevel gear 65 fast on the lower end thereof meshing with a bevel gear 67 fast on the shaft 53 referred to. To drive this shaft at various speeds there is provided a Reeves transmission mechanism 69 (Fig. 4) of usual construction having a shaft 71 journaled in bearings 73 in the sides of the machine frame. On this shaft is a sprocket wheel 75 driven by a sprocket chain 79 and a sprocket wheel 81 fast on a sleeve shaft 83 (Fig. 24). This sleeve shaft is mounted on a solid shaft 85 journaled in bearings 87 in the side frames of the machine, said shaft being extended beyond one of said frames where it is journaled in a bearing in a short standard 89. Fast on this shaft is a fly wheel 91 adapted to be connected to the sleeve shaft by a friction clutch 93. To shift this clutch there is provided a spool 95 on said sleeve shaft appropriately connected to a rocking arm 97 connected in turn to one end of a rod 99 extending transversely of the machine, the opposite end of said rod having a handle 101 (Fig. 1). By shifting said rod the clutch may be thrown to start or stop the sleeve shaft and the drive to the machine as a whole.

To drive the shaft 85 at various speeds there is provided a Reeves transmission mechanism comprising a pulley 102 (Fig. 4) fast on the shaft 85 driven by a belt 102$^a$ from a pulley 102$^b$ fast on a shaft 102$^c$. The latter may be driven by an electric motor or a belt and pulley from any appropriate source of power. The shaft 102$^c$ is the main shaft of the machine and therefore by adjusting the speed by said Reeves transmission mechanism the speed of the entire mechanism may be controlled.

Heretofore, so far as I am aware, gage rolls have been constructed with flanges for determining the width of the dough sheet. The gage rolls shown herein, however, are not provided with flanges since the width of the sheet is determined by the adjustable sides of the trough. This enables a width of sheet to be had which will produce the minimum of scrap or margins along the edges of the sheet with any desired disposition of cutters.

A feed apron 103 for conducting the dough sheet from the gage rolls to the cutter is passed over a large driving roller 105 (Figs. 30 and 31) beneath the trough and fed forwardly beneath the cutter to a point slightly beyond the same where it is passed around a guide conveniently in the form of an angle iron 106 having a rounded edge, said apron being fed thence around guide rollers 107 and 108 back to the large driving roller referred to. The shaft of said roller is provided with a worm wheel 109 (Fig. 1) meshing with a worm 111 fast on a shaft 113 journaled in bearings 115 projecting laterally from one of the side frames of the machine. On the lower end of said shaft is a bevel pinion 119 meshing with a bevel pinion 121 fast on a shaft 123 journaled in bearings in the side frames of the machine. This shaft is driven by a variable speed Reeves transmission mechanism 127 driven in turn by a sprocket wheel 127$^a$, chain 127$^b$ and a sprocket wheel 127$^c$, the latter being fast on the shaft 71 (Fig. 4) referred to in the driving train for the gage rolls.

Having described the trough, the gage rolls, the main apron and the driving mechanism therefor, next will be described mechanism for dieing out articles from the dough sheet fed away from the gage rolls by the apron. To accomplish this dies are provided typified here as cutters 131 and markers or embossers 133 (Figs. 8, 10, 11 and 12). These are carried by an oscillating frame 134 comprising at each side of the machine an arm 135 located outside of, and an arm 137 located inside of, a side member of the machine frame, said arms being provided with arc-like flanges 139 bound by stirrup bolts 141 to a sleeve-like trunnion 143 adapted to rock in a bearing seat 145 formed in a ring bolted to said frame member and having an arc-like cap 146 bolted thereto. The oscillating frame is massive and heavy and by this construction the entire weight thereof is supported on said bearing. The inner arms are provided with flanges 147 at their upper end which are bolted to the outer arms and form a rest for a base 149 for a bed plate 150, said base being also bolted to said outer arms. These outer arms are extended upwardly beyond said bed plate and at the top of each is bolted a pair of vertical guide rods 151 (Fig. 8), connected by caps 153. Supported to slide on said rods is a lower cross head 155 carrying the cutters and an upper cross head 157 carrying the embossers. The cutter cross head is urged upwardly by helical springs 159 seated in chambers formed in said outer arms.

The base is supported on the arms 137 at points 147$^a$ which are located within the planes of the side frames of the machine directly above the points of support for the main bearings of the oscillating arms carrying the bed plate base. Thus the pressure occurring on the bringing of the dies down on to the bed in cutting out biscuits is desirably located to produce a minimum strain on the parts.

The cutters shown herein are of cup form and secured to the lower face of a box-like plate 161 having bridge bars 163 connected by hanger bolts 165 to said cross head 155.

The embossers are in the form of cylindrical blocks contained within the cutter cups and connected by rods 157$^a$ with a plate 157$^b$ adapted to reciprocate vertically in the box plate carrying the cutters. Said plane is provided with lugs 157$^c$ receiving the lower ends of long hanger bolts 157$^d$ which pass upwardly through the cutter cross-head to and through the embosser cross-head and are adjustably held by nuts 157$^e$. These hanger bolts for the embosser plate extend loosely through sleeves 167 which pass through both the cutter and embosser cross-heads and at their upper ends are threaded to an adjusting sleeve 169 journaled in said embosser cross-head 157 and having fast thereon worm wheels 171 (Figs. 8 and 9) meshing with worms 173 one of which is fast on a shaft 175 extending longitudinally of said cross-head and journaled in bearings 177 extending laterally therefrom, said other worm being fast on a sleeve shaft 179 receiving said shaft and journaled in brackets 181 on said cross-head. On outer ends of said shaft and sleeve shaft are hand wheels 183 which may be turned independently or simultaneously as desired according to whether it is desired to adjust the ends of said embosser plate unequally or equally vertically.

Sometimes it is desirable to not only unequally adjust the ends of the embosser carrying plate, but also to rock said plate laterally properly to position the embossers. To accomplish this the lower end of the sleeve is rounded to present a flanged head 185 which is received in a similarly rounded seat 187 at the top of the embosser plate carrying lug, said head being received also by a ring threaded to said lug and having an internal flange 189 resting on said head. By inspection of Fig. 10 it will be understood that the plate may be rocked on the bearing provided by the head 185 and clamped in position by tightening the rings or nuts. By loosening the nuts at the upper ends of the long hanger bolts the adjustment of the embosser plate by the hand wheels is facilitated. By tightening said nuts said plate is securely retained in the position desired.

The bed plate (Fig. 11) may be adjustably supported on the base-plate of the inner arms of the oscillating frame by eccentric shafts 191 seated in appropriate bearings and controlled by worm wheels 193 meshing with worms 195 on a shaft 196 and a sleeve 199 respectively journaled in the outer side arms of the oscillating frame and controlled by hand wheels 201 at the side of the machine. These hand wheels may be turned independently or simultaneously according to whether it is desired to adjust both ends of the bed plate unequally or equally.

Having described the construction of the oscillating frame, the cutters, embossers and the cross-heads supporting the same, next will be described the mechanism for reciprocating said cutters and embossers in dieing out biscuits. To this end the cutter cross-head (Figs. 8, 11, 13 and 14) is extended outwardly beyond the sides of the oscillating frame to present ends which are connected with the upper ends of rods 203 the lower ends of which are connected to straps 205 on eccentrics 207 fast on a sleeve shaft 209 journaled in bushings 211 in the sleeve trunnions referred to for the oscillating frame.

To reciprocate the embosser cross-head it is extended outwardly somewhat beyond the ends of the cutter cross-head to present ends 213 which are connected to the upper ends of rods 215 the lower ends of which are connected to straps 217 on eccentrics 219 formed on a solid eccentric shaft 221 journaled in bushings 223 contained within the hollow shaft referred to.

It will be observed that by the described construction of trunnions for the oscillating frame and the shafts for the eccentrics, the weight of the oscillating frame is taken off of said shafts, thereby reducing the wear thereon and the power necessary to drive the same.

Sometimes it is desired to operate the machine merely to cut biscuits and at other times it is desired to operate the machine both to cut and emboss biscuits. To render the machine convertible for these purposes the embosser eccentrics 219 may be adjusted to a neutral position where they are ineffective to reciprocate the embosser crosshead or they may be adjusted to a position where they are effective to reciprocate said cross-head. To accomplish this each bushing 223 in which the solid eccentric shaft rotates is made with an eccentricity equal to the eccentricity of the end of the shaft 221. Consequently when the latter is turned into one position of adjustment its outer ends are eccentric with the axis of the sleeve shaft for the cutter, but when it is turned through an arc of 180° its eccentricity is neutralized by the equal eccentricity of the bushing and then it is concentric with the axis of the sleeve shaft for the cutter eccentric. To facilitate the turning of said solid shaft to these positions of adjustment, a hand wheel 225 (Figs. 13 and 14) is mounted fast on the outer end thereof. To lock the solid shaft in these different positions of adjustment to said bushing, it is provided with a longitudinal bore 227 receiving a rod 229 on one end of which is a key 231 in a transverse slot 233 in the solid shaft sufficiently large to permit said key to be adjusted into and out of a slot in the inner end of said bushing. To adjust the rod longitudinally its outer end is threaded to receive the hub of a small hand wheel 235 confined against longitudinal movement relatively to said solid shaft by a plate 237 having an aperture encircling an annular groove 239 in said hub. When this hand wheel is turned it will adjust said rod longitudinally and cause said key to enter the slot in the end of the bushing. When out of said slot the large hand wheel on the end of the shaft may turn the latter through an arc of 180° and then said key can be returned into said slot to lock the shaft and bushing in this position.

The eccentrics are so arranged and timed that first the embosser descends and makes an impression on the dough sheet and remains temporarily in contact therewith while the cutter is descending. When the cutter reaches the dough sheet the embosser commences to rise and therefore the cutter cups act as clearers to free from the embosser any dough that might stick thereto. The cutter then continues to descend and dies out the previously embossed portion of the sheet from the main body thereof. Then the cutter gradually begins to ascend and since it has a greater amount of vertical movement than the embosser, the cutter overtakes the latter and the embosser then acts as a clearer for the cutter and prevents the cut pieces of dough from adhering to the latter. Thus the embosser and cutter act mutually to clear each other.

To drive the shafts carrying the eccentrics for reciprocating the cutters and embossers, the sleeve shaft 83 referred to is provided with a pinion 241 meshing with a gear 243 (Figs. 3, 15 and 24) fast on the shaft 209.

An important feature of the invention relates to mechanism for oscillating the cutter frame to cause the cutters and embossers to travel in exact unison with the dough sheet through a substantial distance while they are acting thereon as described above. To accomplish this there is provided a mechanism similar in some respects to that disclosed in my co-pending application Serial No. 851,199, filed July 15, 1914 and comprising a gear 245 (Figs. 7, 11 and 15) fast on the sleeve shaft referred to and adapted to mesh with and drive a gear 247 of equal diameter fast on a stud shaft 249 journaled in a bushing 251 in a boss bearing 253 on one end of an arm 255, the opposite end of which is provided with a boss 257 containing a bushing 259 journaled on said sleeve shaft. The driven gear 247 is connected by a wrist pin 261 with a crank 263 on a stud shaft 265 in line with the axis of the driven gear and journaled in a bushing 267 in a boss bearing 269 on one end of an arm 270 the opposite end of which is provided with a boss 271 containing a bushing 273 also journaled on said sleeve shaft.

The wrist pin referred to is connected by a pitman 275 with an arm 277 (Fig. 16) depending from a hollow shaft 279 journaled in bearings 281 on the machine frame at a point thereon located between the cutter frame and the gage rolls. Fast on said shaft are short arms 283 to which are adjustably connected ends of pitmen 285 the opposite ends of which are pivotally connected to the oscillating cutter frame.

If the axis of the driven gear were held stationary said gear when rotated would oscillate the cutter frame by a crank motion. It is a well known fact in mechanics that a cross-head reciprocated by a crank moves at a continuously varying rate of speed, the maximum speed being at the mid point of its path of reciprocation and the minimum speed being at its limits of reciprocation. A varying rate of speed of the cutters and embossers would be seriously objectionable since the dough sheet is fed continuously at a uniform rate of speed and it is essential that the cutters and embossers should move in exact unison therewith if a perfect product is to be produced. A crank motion, however, has an advantage in the fact that it may be operated at a high rate of speed.

Accordingly the crank motion is utilized but its motion is modified empirically so that at times the crank is bodily advanced and at other times it is bodily retarded to compensate for the speed variation effect had by the rotation of the wrist pin of the crank about its own axis. To produce this compensation effect an eccentric 287 (Figs. 7 and 15) is mounted fast on the sleeve shaft referred to and is provided with a strap 289 connected by a rod 291 with a rocking arm 293 fast on a shaft 295 journaled in bearings in the frame. Also fast on said shaft are arms 297 connected by links 299 with the boss bearings 253 referred to. The effect of this eccentric is to oscillate the driven gear and crank bodily about the axis of the driving gear, thereby compensating for the speed variation effect of said crank.

It is not essential that the oscillating frame be moved continuously in unison with the feed apron since it suffices if it is so moved while the cutters and embossers are in engagement with the dough. On the return stroke of the oscillating frame the cutters and embossers are disengaged from the dough and then the oscillating frame may have a varying rate of speed.

In practice it is found that a correct timing of the cutters and embossers may be had by setting the center of the cutter eccentric at a point 10° back of the center of the oscillator eccentric and by setting the center of the embosser eccentric at a point 35° in advance of the oscillator eccentric, making a total of 45° between the positions of the embossing and cutting eccentrics. By this arrangement the embosser and cutter are caused to travel in elliptic-like orbits 300 and 300ª well shown in Fig. 5.

In operation the embosser descends and engages the dough, making the impression thereon at the point S in the orbit and remains in contact with the dough until the point T is reached. In the meantime the cutter in descending as shown by its orbit engages the dough at point T and the embosser commences to disengage the dough at said point. Thus it is clearly shown that the cutter cups act as a clearer to free the dough from the embosser. The cutter after passing the point T continues to descend until point U is reached and the previously embossed dough is severed from the sheet. The cutter after passing point U then begins gradually to ascend and overtakes the embosser at point V on their orbits. Then the embosser acts as a clearer for the cutter and frees the died out dough therefrom. It will be observed that either the cutter or the embosser was in engagement with the dough from the time the embosser engaged the same at the point S until the point U is reached. Consequently they are acting on the dough while the latter is traveling a very substantial distance. Thus becomes apparent the importance of causing them to move in unison with the sheet.

As stated, in some cases it is desired merely to cut and not emboss the biscuits. To accomplish this the embossers are removed and their eccentrics are adjusted to neutral positions as described. The cutter when used alone, however, has the desired travel in unison with the dough throughout the time that it is in engagement therewith.

As stated, the cutter frame is of heavy massive construction. Therefore, when it is rapidly oscillated it acquires a momentum of considerable force. To alternately quickly change the direction thereof would place a heavy burden on the mechanism for oscillating said frame and develop objectable pounding and vibration in the machine. To relieve the mechanism of this burden so far as possible means is provided for counter-balancing said frame. To accomplish this a heavy weight 301 (Fig. 16) is provided on the rocking arm 277 referred to in the mechanism for oscillating the cutter frame. This weight urged by gravity tends to remain in a position vertically downward. When the oscillating frame, for example, is rocked to the right the counter-balance weight is rocked to the left and in its effort to return to its original position it acts on the frame and tends to rock the same back to its vertical position. Thus in moving oppositely to the frame it tends to counter-balance the same and very materially relieves the mechanism of the work in oscillating said frame and facilitates the rapid oscillation of said frame.

When the cutter is employed to die out large biscuits obviously it must have a larger arc of oscillation than when cutting out small biscuits. To vary this arc the upper pitmen extending from the arms on the rocking shaft 279 to said frame are adjustably connected to said arms. To this end said pitman are each pivotally connected to a wrist pin 303 (Fig. 16) on a block 305 adapted to be slid radially in a guideway 307 in said arm by a screw 309 threaded through said block and journaled in said arm. This screw may be rotated by a bevel gear 311 fast thereon driven by a similar bevel gear 313 fast on a shaft 315 journaled in bearings 317 within the hollow shaft of said arm. To permit the turning of said shaft to rotate said screws as described, it is provided with a sprocket wheel 319 fast on said shaft and driven by a sprocket chain 321 and a sprocket wheel 323 fast on the hub of a hand wheel 325 journaled on the sleeve shaft carrying the hand wheel 326 for turning the sprocket wheel 326ª which is connected by a chain 326ᵇ (Fig. 1) with a sprocket wheel 326ᶜ for adjusting the Reeves transmission 127 referred to for varying the speed of the main apron. The hand wheel 325 can be adjusted while the machine is operating as well as when it is stationary. This is an important advantage since the arc of movement of the cutter frame can be readily adjusted to conform to the size of biscuits died out. If a single row of cutters is employed the width of scrap dough between cutters may be varied to give the necessary strength of scrap according to the consistency and character of the dough to insure the feeding of the scrap on the scrap apron without interruption or breaking.

The main apron is constructed and arranged to convey the biscuits merely a short distance from the cutter. From this point they are conveyed by a delivery apron 327 and deposited on pans fed by a pan carrier. The delivery apron is separate from said main apron, but arranged closely adjacent thereto. It passes around an angle iron 329 (Figs. 2, 3, 30 and 31) extending transversely across the machine from one side frame to the other closely adjacent the angle iron 106 referred to for guiding the main feed apron at this point. The delivery apron extends forwardly and downwardly around a panner blade 331 to be referred to, thence rearwardly and is looped around a movable guide-roll 333. It extends from said roll forwardly around a driving roll 335 journaled in fixed bearings in the frame. The apron extends thence rearwardly around a small guide roller 337 to said angle iron 329.

Said movable roll and panner blade are carried by an elongated frame (Fig. 29) comprising side bars 339 and cross rods 341 the forward ends 343 of said side bars being inclined downward toward the pan carrier, where they are connected to the panner blade. This frame is provided substantially midway between its ends with a shaft 345 on which are journaled small wheels 347 adapted to run along channel tracks 349 in said side frames.

The frame is reciprocated in order to intermittently retreat the panner blade and movable roller so as alternately to shorten and lengthen the supporting surface of the apron and thereby withdraw a portion of said apron from beneath the biscuits adjacent the delivery end thereof to deposit the same. The movement of the roller is simultaneous with the panner blade so that the loop of the apron around said roller is alternately shortened and lengthened to take up and let off the apron as its upper surface is shortened and lengthened. The panner blade also is intermittently moved upward and downward somewhat in order that it may be at a sufficient distance to clear the sides of the pans on the carrier when moving forward and be close to the bottoms of the pans when retreating to deposit biscuits thereon.

To impart the horizontal and vertical reciprocating movements to the panner blade and shaft carrying the movable roller of said frame is provided with pinions 351 adapted to be rotated to cause them to travel along internal elliptic-like racks 353 (Fig. 19) contained within boxes 355 mounted in ways 357 on the side frames of the machine. Each of these racks is provided with a central horizontal rib 359 forming a guideway for receiving an end of said roller shaft and thereby facilitating the travel of said pinions about said racks.

To rotate said pinions and cause their travel described a sprocket wheel 361 is made fast to said pinion and is driven by a sprocket chain 363 from a sprocket wheel 365 on a short shaft 367 journaled in an arm 369 depending from said pinion and adapted to oscillate about the axis thereof. Said short shaft is connected by an arm 371 with a shaft 373 journaled in bearings in the frame of the machine and is adapted to oscillate about said shaft. Rotation is transmitted from said shaft to said short shaft by sprocket wheels 377 and 379 thereon connected by a sprocket chain 381. The shaft 373 has a gear 374 thereon meshing with a gear 383 (Figs. 18 and 20) on a shaft 385 journaled in bearings 387 in the side frames of the machine, said shaft being driven by a sprocket wheel 389 thereon driven in turn by a sprocket chain 391 from a sprocket wheel 393 fast on the driven shaft 395 (Fig. 18) of a speed change gear mechanism to be referred to. By the transmission described rotation is imparted from said shaft 373 to the pinions 351 coöperating with the internal racks 353, thereby causing said pinions to travel around said racks. In the course of this travel the panner blade frame will be reciprocated forwardly and backwardly to deposit biscuits and at the limits of its reciprocation will be tilted upward and downward as the pinions ride to and from the lower and upper runs of said internal racks to bring the panner blade close to the pans when depositing and up clear of said pans when advancing in readiness to deposit.

The driving roller 335 referred to for the delivery apron is driven continuously by a sprocket wheel 397 (Fig. 21) on the shaft of said roller, said sprocket wheel in turn being driven by a sprocket chain 399 and a sprocket wheel 401 (Fig. 21) fast on the shaft 373 (Fig. 2) referred to.

Since the apron is driven continuously the panner blade is retreated merely a distance corresponding to one-half of the length of the pan, the combined effect of the forward feeding of the apron and the retreating of the panner blade operating to deposit biscuits on the entire length of a pan with the exception of small margins at the ends of the pan.

To vary the position of the panner blade so that biscuits will not hang over the edge of the blade on the extreme retreat thereof in depositing the boxes contained the internal racks are adapted to slide along the frame. To this end they are provided with lugs 405 (Fig. 19) tapped to receive screws 407 journaled in bearing brackets 409 projecting from the frame and adapted to be rotated by bevel pinions 411 meshing with bevel pinions 413 on a shaft 415 (Fig. 29) extending transversely across the frame and journaled in bearings therein. This shaft is rotated by a sprocket wheel 417 and a sprocket chain 419 from a sprocket wheel 421 on a shaft 423 extending transversely across the frame and journaled in bearing brackets depending therefrom, said shaft being controlled by a hand wheel 427 fast thereon. This hand wheel is located adjacent the forward or delivery end of the machine, where it is conveniently accessible to the operator.

As stated, the main apron is separate from the delivery apron. There are important advantages in this arrangement since the delivery apron is immune from any irregularity of motion or other influence from the main apron which might be occasioned by the intermittent action of the cutters thereon. On the other hand the main apron is free from being influenced in any way by the irregularity of motion which may be occasioned by the alternate shortening and lengthening of the supporting surface of the delivery apron or the moving of its delivery end up and down in depositing the biscuits as described. This independence therefore contributes to the dieing out of perfect biscuits and the safe delivery thereof without mutilation of the pans.

Next will be described the carrier for conveying the pans beneath the discharge end of the delivery carrier. This carrier comprises sprocket chains 429 (Fig. 2) on sprocket wheels 431 fast on a sleeve shaft 433 on the shaft 385 referred to and wheels 432 fast on the shaft 435 journaled in bearings in the machine frame. These sprocket chains are provided with lugs 437 at appropriate intervals to conform to the length of the pans and adapted to engage the same and cause them to move with the carrier. Both the delivery carrier and the pan carrier may be fed at the same speed while biscuits are being deposited, but these speeds should be varied to conform to the speed of the main apron which obviously must be fed more rapidly in dieing out large biscuits than in dieing out small biscuits. The speed varying mechanism for the delivery apron and pan carrier will next be described. To this end the driving gear 245 of the cutter frame oscillating mechanism is utilized to drive gear 441 (Fig. 15) fast on a countershaft 443 journaled in bearings in the side frames of the machine and projecting beyond one of said side frames, where it has a gear 447 fast thereon. This gear meshes with and drives a gear 449 (Fig. 18) fast on a shaft 451 journaled in bearings 453 in the side frames of the machine. The latter shaft has fast on its opposite end a pinion 455 driving a gear 457 fast on a shaft 459 journaled in bearings in the side frames of the machine and constituting the driving shaft of the speed change gear mechanism referred to. Fast on this shaft are a series of different sized gears 463 meshing with gears 465 loose on the shaft 395 referred to. This shaft is provided with pockets 469 containing a plurality of keys 471 which are urged radially outward from said shaft by springs 473. When any of these gears are in alinement with a key on said shaft said key is free to project out and make such gear fast to said shaft. When in intermediate positions had by the axial adjustment of said shaft they are retreated into their pockets by their engagement with rings 475 interposed between said gears. To move the shaft axially and connect said gears selectively as desired, one end thereof has a portion threaded to a short sleeve 477 provided with a hand wheel 479 and confined against movement axially of said shaft. By turning this hand wheel obviously the shaft can be adjusted axially to the positions desired. The drive is transmitted from the driven shaft 395 by the sprocket wheels 393 and 389 and their chains to the shaft 385 referred to.

By the mechanism described it will be apparent that the pan carrier may be driven at varying speeds conforming to the sizes of biscuits died out as desired. The speed change gears are constructed with ratios appropriate for causing the pan carrier to move predetermined distances conforming to the number of rows of biscuits cut. Obviously the greater the number of rows cut, the greater should be the length of travel of the pan carrier.

The carrier, however, should be so driven as to centralize the batches of biscuits on the pans, prevent the depositing of biscuits on the ends of adjacent pans, and provide equal or sufficient margins at the ends of the pans. To accomplish this the pan carrier is moved more rapidly while the panner blade is advanced forwardly during the interval when it is not depositing than when the panner blade is retreated to deposit biscuits. As a result when the panner blade commences to retreat to deposit the batch, it will place it on the bottom of the pan a short distance from the ends thereof.

To impart the above described movements to the pan carrier there is provided a differential gear mechanism (Figs. 18 and 20) comprising a driving bevel gear 493 having a hub 495 fast on the shaft 385 and adapted to drive a similar bevel gear 496 opposed thereto fast on the sleeve shaft 435. Rotation from the driving to the driven gear is transmitted through intermediate pinions 499 meshing therewith and journaled on stud shafts 501 projecting radially inward from a cylindrical box or casing 503 having internal diametrically opposed bosses 505 journaled on the hubs of said driving and driven gears.

Obviously, if the cylindrical box carrying the intermediate pinions is held stationary the driving gear will transmit its speed to the driven gear. If, however, the box is oscillated it will vary the speed transmitted, accelerating it when rocked in one direction and retarding it when rocked in the opposite direction. To thus oscillate said box it is provided with a lug 507 (Fig. 20) pivotally connected by a link rod 509 with an arm 511 (Fig. 21) fast on and adapted to oscillate about the axis of a shaft 513 journaled in bearings 515 in the side frames. Moving with this arm is a follower 517 for engagement with a cam 519 (Fig. 20) comprising a concentric cylindrical portion 521 and a heart shaped portion 523 of varying radius. This heart shaped portion has a contour conforming to two true spirals of Archimedes and therefore when it acts on the follower it rocks the differential box at a uniform rate. Thus two rates of speed are imparted to the pan carrier, one rate during the delivery of biscuits and the other between the intervals of delivery. The pan carrier, however, is fed continuously forward while it is experiencing this speed variation and the transition from one speed to another is so gradual that there is no possibility of imparting a sudden movement to the carrier such as would be likely to disturb the biscuits on the pans.

The length of the arc of oscillation of the differential gear box should conform to the length of pan employed, the size of biscuits, the disposition or positioning of the biscuits on the pan and the extent of margin between the biscuits and the ends of the pan desired. To vary these periods the follower 517 is adjusted axially along the heart-shaped cam which, as stated, is of varying radius. To accomplish this the follower is adapted to slide along a shaft 525 mounted on the rocking arm 511 and a similar arm 511ª. The follower is set in a fork nut 527 threaded on a shaft 529 mounted on the rock arms 511 and 511ª and parallel with said shaft. The shaft 529 has a hand wheel 531 conveniently accessible at one end of said shaft. By turning this hand wheel the follower may be moved axially of the heart-shaped cam and the extent of throw of the follower arm varied as desired. The follower operating through the link connecting the same with the differential gear box in turn varies the arc of oscillation of said box.

It is also desirable to adjust the pan carrier relatively to the delivery carrier so that the lugs on the former will have a proper relation to the panner blade of the latter to insure the centering of a batch of the biscuits on the pan and prevent their being deposited on the edges of the pan. To accomplish this the rod connecting the follower arm with the differential gear box comprises a sleeve 533 in which is threaded a rod 535 (Figs. 20 and 21) passing through a boss 536 on a shaft 536$^a$ connecting the tops of oscillating arms 511 and 511$^a$ and extending beyond said shaft, where it is provided with a universal joint 537 connecting the same with a rod 539 splined to and telescoping into a sleeve 541 journaled in a bearing 543 on a yoke 545 mounted on and adapted to oscillate about the shaft 423 referred to. Fast on the sleeve 541 is a bevel gear 547 adapted to be driven by a bevel gear 549 on the shaft 423. Fast on one end of this shaft is a hand wheel 555. When the latter is rotated it will operate through said bevel gears and rotate said sleeve, the latter imparting rotation to said universally connected rods, thereby causing the one of them which is threaded into the sleeve connected to the differential gear box to rotate and lengthen or shorten the distance from the free end of the oscillating follower arm to the point of pivotal connection of the rod with the gear box.

The shaft 539 slides in the sleeves 541 and permits the rocking of the differential gear casing.

By the construction described the various adjustments of the mechanism for controlling the pan carrier may be effected while the machine is in operation. This is a highly desirable arrangement since by it the action of the machine may be observed while an adjustment is made and a desirable nicety of adjustment may be had.

The extensible scrap apron and the mechanism for driving the same with provision for controlling the speed adjacent the delivery end of the machine will next be described. The apron is shown herein at 557 (Figs. 1, 2, 3, 4 and 32) extending from a point intermediate the length of the delivery apron upwardly and rearwardly over the cutter frame and thence rearwardly toward the feeding-in end of the machine. The apron is guided around a small roller 559 at the receiving end thereof journaled in bearings 561 in side frame members 563 connected by rods and rollers 565 and adjustably supported at its receiving end with varying elevation by hand screws 567 threaded in lugs 569 on said side frame members and having ends adapted to bear against the tops of the side frames of the machine. This frame inclines upwardly and is provided with brackets 571 pivotally connected to a rod 573 extending transversely of the machine and supported on a frame comprising angle iron members 575 extending longitudinally of the machine and carried by posts 577 and 593 projecting upwardly from the side frames of the machine. The upper horizontal run of the apron is guided by a roller 579 journaled in bearings 581 in said members. The delivery end of the apron is guided around a roller 583 journaled in bearings 585 in an extensible frame 586 provided with blocks 586$^a$ (Fig. 17) grooved to slide along said angle iron members referred to. This sliding frame is provided with bearings in which is journaled a roller 597 about which the apron is looped. The apron passes thence rearwardly around a drive roller 599 and forwardly around small guide rollers 601 at the juncture of the horizontal and inclined frames and thence downwardly to the roller at the receiving-in end of the apron.

To vary the length of the scrap apron to deliver the scrap at points appropriate for one or two sets of gage rollers or otherwise as described, the sliding frame is provided with racks 603 meshing with pinions 605 fast on a shaft 607 journaled in bearings on the frame referred to, said shaft having a hand wheel 611 fast on one end thereof. By turning this wheel the pinions will cause the rack and the frame connected thereto to slide longitudinally and vary the area of the supporting surface of the scrap apron as desired. The guide rollers at the ends of the sliding frame are of course adjustable therewith and the inner roller operates to take up and let off the apron as desired.

The driving mechanism for the scrap apron comprises a worm wheel 612, (Fig. 4) fast on the shaft of the drive roller 599 and meshes with a worm 613 on a short shaft 615 journaled in bearings in a bifurcated arm 617 depending downwardly and rearwardly from said scrap apron supporting frame. This worm shaft is connected by a universal joint 619 to one end of a diagonally downwardly extending shaft 621, the opposite end of said shaft being connected by a similar universal joint 623 with a similar shaft 625 journaled in bearings in brackets 629 projecting from one of the side frames of the machine. Fast on this shaft is a horizontal friction disk 631 adapted to be driven by a friction pinion 633 splined to a shaft 635 journaled in bearings 637 in the side frames of the machine and adapted to be driven by the Reeves variable speed transmission mechanism 127 referred to for driving the main apron.

The friction pinion may be adjusted radially along the friction disk to vary the speed imparted to the scrap apron to conform to conditions as required. To accomplish this said friction pinion is connected to an arm 641 threaded to a shaft 645 journaled in bearings in the side frames of the machine. Said shaft is adapted to be turned by a bevel gear 651 fast thereon meshing with a bevel gear 653 fast on a stud shaft 655 journaled in a bearing 657 in a bracket projecting laterally from one of the side frames of the machine. The shaft 655 is connected by a universal joint 671 with an upwardly projecting shaft 673, the upper end of which is connected by a similar universal joint 675 with a short shaft 677 journaled in a bearing 679 in a bracket 681 depending from the scrap apron supporting frame. The shaft 677 has a gear 682 meshing with a bevel gear 683 on a long horizontal shaft 685 journaled in bearings in brackets 689 projecting laterally from said scrap apron frame. The opposite end of this long shaft has a bevel gear 691 fast thereon adjacent the juncture of the horizontal and inclined runs of the scrap apron frame, said bevel gear meshing with a bevel gear 693 on the shaft 573, referred to, extending transversely of the machine. The opposite end of this shaft has a bevel gear 695 thereon meshing with a bevel gear 697 fast on a long shaft 699 journaled in brackets 701 depending from the inclined run of the scrap apron frame. The lower end of this shaft has a hand wheel 703 fast thereon. By turning this hand wheel through the connections described the screw shaft is turned and the sleeve arm carrying the friction pinion is adjusted axially of said screw shaft to slide said friction pinion radially toward or from the center of the horizontal friction disk, thereby varying the speed of the feed of the scrap apron as required. This hand wheel, it will be observed, is located conveniently adjacent the delivery end of the machine where it is readily accessible to the operator in charge of the machine.

In some cases it is desirable to obtain a better finish on the surface of the dough sheet than can be had with a single set of gage rolls. To accomplish this an extra set of rolls (Fig. 28) is provided comprising a lower roll 705 and an upper roll 707 journaled in boxes 709 mounted on a frame 711. These rolls may be driven by worm wheels, shafts, and bevel gears 719 and 721 similar to those already described. A trough 723 is appropriately mounted on the frame for the gage rolls and is arranged to deliver the dough to said rolls. When this supplemental set of gage rolls is employed the trough for the first set of rolls described is removed. To convey the dough sheet from one set of rolls to the other there may be provided an endless apron 725 guided around a small roller 726 journaled on a frame 727 which may be supported for tilting and longitudinal adjustment in any appropriate manner. The apron is guided around two intermediate rollers 729 and 731 journaled on brackets 733 on said frame. The apron is led thence to and around a driving roller 735 journaled in bearings on the frame 727. Fast on the shaft of said roller is a worm wheel 737 meshing with a worm 739 on an inclined shaft 741 journaled in bearings in the machine frame and having at the lower end thereof a friction disk 747 engaging and adjustable along a large friction disk 749 fast on a shaft journaled in bearings in the frame. By relatively adjusting the disks the speed of feed of the apron may be varied as desired. In use the supplemental gage roll frame is presented to the main frame of the machine and the tilting apron is adjusted to present its delivery end at the bite of the gage rolls 15 and 17. Dough is then placed on the trough and fed through the supplemental rolls to the tilting apron which feeds the sheet to and between the other set of rolls.

It will be observed that substantially all of the hand wheels and controlling devices for the machine are located at one side thereof where they are conveniently accessible. The control of the machine is further facilitated by the arrangement of the hand wheels in sets with the wheels of a set on the same axis. This reduces the number of shafts required and desirably localizes the control. It also permits adjustment of two different parts to be made simultaneously and equally or with predetermined ratios.

In operation the dough is placed on the trough and fed through the gage rolls and thereby flattened into a sheet which is deposited on to the main apron and fed thereby to and between the bed plate and cutters and embossers which are carried by the oscillating frame. Then the embossers descend and make an impression on the dough sheet. They do not merely make an impress but depress some portions of the material and elevate other portions. The cutters then subsequently are brought down and die out the portions of the sheet thus embossed. The cutting subsequent to the embossing prevents any mutilation of the biscuit such as might be occasioned by the embossing subsequent to the cutting. The embossers and cutters mutually clear one another, and prevent the lifting of the dough up from the apron and thus avoid the dropping of the biscuits thereon such as might be likely to cause mutilation thereof.

The oscillating cutter and embosser frame is reciprocated by the crank gear having the combined oscillating and rotating movement described, thereby causing the cutters and embossers to move in exact unison with the dough while acting thereon. The counterbalancing of this frame permits the rapid oscillation thereof to conform to the high speed continuous movement of the main apron. The biscuits thus embossed and died out are fed from the main apron to the delivery apron which conveys the biscuits thence to the pans on the pan carrier. The scrap dough surrounding the died out biscuits is fed by the scrap apron up over the machine back to the feeding-in trough, where it is mixed with the dough. The panner blade of the delivery apron is reciprocated by the rack and pinion mechanism alternately to shorten and lengthen the effective supporting area of said apron in performing the depositing of the biscuits from said apron on to the pans. Incidental to the reciprocation of the panner blade it is moved vertically up and down at the limits of its horizontal reciprocation to bring the panner blade close to the pans when depositing and to lift the same up above the ends of the pans while the delivery carrier is advancing in readiness to make the next depositing operation.

The pan carrier is fed continuously and its speed is varied by the speed change gears described to conform to the speed of the delivery carrier. In depositing the biscuits from the delivery apron to a pan it is merely necessary to retreat the panner blade one-half the length of a pan since the delivery apron is being fed forward at the same time that the panner blade is retreated. The pan carrier may be advanced in unison with the delivery apron while receiving biscuits and at a more rapid speed while the panner blade of said apron is moved forward in readiness to deposit biscuits. Thus appropriate margins are provided between a batch of biscuits and the ends of the pan. In order that the batch may be centralized within the pan and provide equal margins, the connecting link between the differential and the cam follower may be lengthened or shortened as desired. It will be observed that both the adjustment of the link and the follower may be effected while the machine is in operation, thereby permitting a desirable nicety of adjustment to conform to conditions observed while the machine is operating. If it is desired to deliver the biscuits directly into an appropriate oven and not deposit the same on pans the necessity for alternating different speeds of the pan carrier is eliminated. In such case the cam follower is adjusted to the cylindrical concentric portion of the cam and then the pan carrier is fed continuously at one speed.

By adjusting the heart cam mechanism the pan carrier may be caused to move more or less rapidly than the delivery carrier. If more rapidly it will provide greater spaces between the biscuits than they had on the delivery carrier, and if more slowly their spaces will be less and the biscuits will be more compactly arranged on the pan than on the delivery carrier. This has an important advantage, since it enables the spaces between the biscuits when on the delivery carrier to be sufficient to provide a width of scrap material strong enough to insure a continuous unbroken scrap sheet, and it enables the biscuits to be placed sufficiently close together on the pans to utilize the maximum capacity of the latter.

The pan carrier is not jerked forward with a sudden quick movement to advance the same ahead of the carrier and prevent the depositing of biscuits on the ends of adjacent pans, but on the contrary it is moved gradually forward throughout the period occupied by the panner blade in moving forward during the interval while it is not depositing biscuits. Thus the movement of the pan carrier is smooth and without danger of disturbing the biscuits on the pans and mutilating the same.

The machine is convertible since by it the embossers may be readily removed and inserted and their operating mechanism thrown into or out of operation so that biscuits may be embossed and cut or merely cut as desired.

The machine can also be used as a peeling machine. The combined horizontal and up and down reciprocations of the panner blade places the same in a position readily permitting the edge of a peel to be placed beneath the same against the pan locating lugs on the pan carrier, thereby properly determining the position of the peel appropriate for receiving a batch of biscuits on the retreat of the panner blade. The batch thus deposited may then be lifted by the peel from the pan carrier and placed in the oven for baking.

So far as I am aware, I am the first to provide a machine of this type in which biscuits may be both cut and embossed from a dough sheet fed by a continuously moving apron. This continuous movement of the apron contributes materially to a large output in a small space of time. The construction and arrangement of the oscillating cutter and embosser frame makes possible the high speed of oscillation thereof to conform to the speed of the apron. The high speed does not sacrifice the quality of the product but on the contrary perfect biscuits may be produced.

It will be observed that the counterbalance weight for the cutter frame is considerably less in mass than said frame, but since its center of gravity is at a greater distance from the axis of the shaft 315 about which it oscillates than the point of pivotal connection of the pitman 205 with the arm 283, it follows that the weight may operate with sufficient mechanical advantage to compensate for its mass being unequal to that of the cutter frame. There is an important advantage in having the weight small since if its weight equaled that of the cutter frame the total mass oscillated would be doubled and the work essential to operate the same would be objectionably large.

When a large arc of vibration of the cutter frame is desired, the pitmen 205 are adjusted away from the axis of the shaft 315 and the frame is oscillated more slowly, but when a short arc of vibration is desired the pitmen are adjusted toward said axis and the frame is oscillated more rapidly. This increases the kinetic energy of the parts and renders the counterbalance effect more important. However, as the pitmen are adjusted toward said axis the mechanical advantage of the weight arm over the pitman arm is increased and the counterbalance effect is desirably proportionally increased.

While the machine is described herein more particularly in connection with the dieing out of biscuits, it will be understood that features thereof may be employed in brick making and other machines. It is not indispensable that all of the features of the machine be used conjointly since some of them may be used separately to advantage.

Having described one illustrative embodiment of the invention without limiting the same thereto, what I claim as new and desire to secure by Letters Patent is:

1. In a machine of the class described, the combination of superposed flangeless gage rolls with a feeding-in trough leading to the bite of the said rolls and having a bottom and adjustable sides, and means for holding the latter in different positions of adjustment for varying the width of the sheet of plastic material fed between said rolls.

2. In a machine of the class described, the combination of a cutter frame, a cutter carried thereby, means for automatically continuously operating said cutter frame in opposite directions, and means for counterbalancing said frame in movement of the latter in opposite directions.

3. In a machine of the class described, the combination of a cutter frame, a cutter carried thereby, means for automatically continuously operating said cutter frame in opposite directions, and a weight for counter-balancing said frame on movement of the latter in opposite directions.

4. In a machine of the class described, the combination of a cutter frame, a cutter carried thereby, and means for automatically continuously oscillating said frame including a weight movable in opposition to said frame to counterbalance the same in opposite directions.

5. In a machine of the class described, the combination of a rocking frame, a cutter carried thereby, means for automatically continuously rocking said frame, a weight and means for rocking the same in an opposite direction to said frame to counterbalance the latter.

6. In a machine of the class described, the combination of an apron, means for feeding the same continuously, a rocking frame, a cutter carried thereby, means for imparting to said frame a movement in unison with said apron, and means for counter-balancing said frame.

7. In a machine of the class described, the combination of a frame, a cutter carried thereby, a rocking lever, a pitman connecting said lever to said frame, a weight carried by said lever for counter-balancing said frame, and means for rocking said lever to oscillate said frame.

8. In a machine of the class described, the combination of a frame, a cutter carried thereby, a rocking lever, a pitman connecting said lever to said frame, a weight for counter-balancing said frame movable with said lever, and means for imparting a movement to said frame at a uniform rate.

9. In a machine of the class described, the combination of means for feeding material continuously through the machine, a frame, a cutter and an embosser carried thereby; and means for causing said embosser and cutter to act progressively upon said material while the latter is in motion.

10. In a machine of the class described, the combination of means for feeding material continuously through the machine, a frame; an embosser, and a cutter carried thereby; means for causing said embosser and cutter to act progressively on said material, and means for causing them to move in unison with the material while they are acting thereon.

11. In a machine of the class described, the combination of means for feeding material continuously through the machine, an oscillating frame; an embosser and cutter carried thereby; means for causing said embosser and cutter to act successively on said material; and actuating means for said frame for causing said embosser and cutter to travel in unison with said material while acting thereon.

12. In a machine of the class described, the combination of means for feeding material continuously through the machine, a frame, devices carried by said frame, means for causing said devices successively to act on said material, and means for causing said devices to travel in unison with said material while acting thereon.

13. In a machine of the class described a fixed support, means for feeding a sheet of material thereover, an embosser, a cutter and means for reciprocating them to act upon the material, said embosser having an up stroke commencing during the down stroke of the cutter and said cutter terminating its up stroke above the embosser.

14. In a machine of the class described, the combination of means for feeding sheet material continuously through the machine, an embosser, a cutter, means for causing the same to emboss and die out articles from said sheet material, said means having provision for causing each to clear material from the other, and means for causing them to travel in unison with the material while acting thereon.

15. In a machine of the class described, the combination of means for feeding material continuously through the machine, a marker, a cutter, means for reciprocating the same independently of one another for marking and dieing out articles from said material, and means for causing the same to travel in unison with the material while acting thereon.

16. In a machine of the class described, the combination of a marker, a cutter, and means for reciprocating said marker and cutter to mark and die out articles from material, said means having provision for timing the reciprocating thereof to move the marker and cutter relatively to one another and cause each to strip the material from the other.

17. In a machine of the class described, the combination of means for feeding sheet material continuously through the machine, a frame; a marker and cutter carried thereby, means for causing said marker to impress said sheet of material, means for causing the cutter subsequently to die out the material thus impressed, and means for causing said marker and cutter to move in unison with the material while acting thereon.

18. In a machine of the class described, the combination of a marker, a cutter, and means for causing the same to mark and die out articles from material, said means having provision for causing said marker and cutter to travel through intersecting orbits.

19. In a machine of the class described, the combination of a marker, a cutter, and means for causing the same to mark and cut articles from material, said means having provision for causing said marker and cutter to travel through intersecting elliptic-like orbits.

20. In a machine of the class described, the combination of an embosser, a cutter, and means for reciprocating the same having provision for causing the same to travel in intersecting elliptic-like orbits.

21. In a machine of the class described, the combination of means for feeding sheet material continuously through the machine, an embosser, a cutter, a frame therefor, means for reciprocating said cutter and embosser relatively to one another in said frame to cause them to emboss and die out articles from said sheet of material, and means for reciprocating said frame and having provision for causing the same to have a movement in unison with said material.

22. In a machine of the class described, the combination of means for feeding sheet material continuously through the machine, an embosser, a cutter, a frame therefor, means for reciprocating said cutter and embosser in said frame, and means for simultaneously moving said frame to cause said cutter and embosser to travel in unison with the material acted on thereby.

23. In a machine of the class described, the combination of an apron, means for feeding the same, an oscillating frame, a cutter and embosser carried thereby, means for vertically reciprocating said cutter and embosser in said frame to cause them to emboss and die out articles from a sheet of plastic material fed by said apron, and means for imparting to said frame a movement in unison with said material.

24. In a machine of the class described, the combination of means for feeding sheet material continuously from the machine, a frame; a cutter; an embosser and bed plate carried by said frame; means for relatively vertically reciprocating said embosser and cutter in said frame, and means for imparting to said frame a movement in unison with said sheet of material.

25. In a machine of the class described, a co-acting cutter and embosser operative upon a sheet of dough and adapted to mutually clear one another, and operating means therefore relatively timed so that the embosser operates upon the dough before the cutter and begins its up-stroke when the cutter reaches the dough sheet and is overtaken in its up-stroke by the cutter.

26. In a machine of the class described, the combination of means for feeding sheet material continuously through the machine, an embosser, a cutter, a frame carrying the same, means for reciprocating said embosser and cutter to emboss and die out articles from said sheet of material, and means for imparting to said frame a movement causing said embosser and cutter to travel in unison with the material while acting thereon.

27. In a machine of the class described, the combination of a shaft, a frame adapted to oscillate about said shaft, an embosser and cutter carried by said frame, means including eccentrics on said shaft for reciprocating said cutter and embosser in said frame, and means for imparting a rocking movement to said frame about said shaft for causing said cutter and embosser to travel in unison with a sheet of material while acting thereon.

28. In a machine of the class described the combination of a shaft, a frame adapted to oscillate thereon, a cutter and embosser carried by said frame, means including eccentrics on said shaft for reciprocating said cutter and embosser, said embosser eccentric having provision permitting the adjustment thereof through an arc of 180° to positions of eccentricity and non-eccentricity with said shaft.

29. In a machine of the class described, the combination of a cutter, an embosser, a hollow shaft, an eccentric thereon for reciprocating said cutter, an eccentric bushing mounted in said shaft, a shaft in said bushing having an eccentric portion, a strap on said portion, means connecting said strap with said embosser, and means for locking said eccentric shaft to said bushing in positions for rendering said eccentric portion effective or ineffective to reciprocate said embosser.

30. In a machine of the class described, the combination of a cutter, an embosser, a hollow shaft, an eccentric thereon for reciprocating said cutter, a shaft within said hollow shaft having an eccentric thereon for reciprocating said embosser, an eccentric bushing interposed between said cutter and embosser shafts, and means for securing said embosser shaft in different positions of adjustment in said bushing for rendering said embosser eccentric effective or ineffective to reciprocate said embosser.

31. In a machine of the class described, the combination of a cutter, an embosser, a hollow shaft, an eccentric thereon for reciprocating said cutter, a shaft within said hollow shaft having an eccentric for reciprocating said embosser, an eccentric bushing within said hollow shaft within and connected to said hollow shaft, and means for locking said hollow shaft to said eccentric bushing in different positions of adjustment to render the eccentric thereof effective or ineffective at will for reciprocating said embosser.

32. In a machine of the class described, the combination of a cutter, means for reciprocating the same, an apron for receiving articles died out by said cutter, a delivery apron and means for alternately lengthening and shortening said apron to deliver the articles therefrom including a panner blade, a frame connected thereto, spaced racks, a pinion journaled on said frame and meshing with said racks, and means for rotating said pinion and causing the same to come and go on said racks respectively to reciprocate and to tilt said panner blade.

33. In a machine of the class described, the combination of means to die articles from plastic material, a delivery apron for receiving said articles; and means alternately to lengthen and shorten said apron including a panner blade, a frame connected thereto, a stationary guide roll for said apron, a roll journaled in said frame for guiding said apron, a pinion carried by said frame, spaced racks to mesh with said pinion, and means for rotating said pinion to cause the same to come and go on said racks respectively reciprocate said frame and blade and to tilt the frame.

34. In a machine of the class described, the combination of means to die out articles from a sheet of plastic material, a delivery apron for receiving said articles, and means for alternately lengthening and shortening the effective supporting area of said apron including a tilting frame, a panner blade carried thereby, tracks, wheels on said frame adapted to travel along said tracks, a roller journaled on said frame, a pinion on said frame, an elliptic-like rack, and means for causing said pinion to travel around said rack and thereby reciprocate said blade and rock said frame about the axis of said wheel to elevate and lower said blade.

35. In a machine of the class described, the combination of means to die out articles from a sheet of plastic material, a delivery apron for receiving said articles, and means alternately to lengthen and shorten said apron to deliver the articles therefrom including a mangle rack and pinion, and means for adjusting said rack bodily.

36. In a machine of the class described, the combination of means to die out articles from material, a delivery apron for receiving said articles, a supporting frame for said apron, means including a mangle rack and pinion alternately to shorten and lengthen said apron and means for automatically tilting said frame bodily for elevating and lowering the delivery end of said apron.

37. In a machine of the class described, the combination of means to die out articles from a sheet of plastic material, a delivery apron for receiving said articles, and means alternately to shorten and lengthen said apron to discharge the articles therefrom including an orbital rack, a pinion, and means for rotating said pinion and causing the same to come and go on said rack in different planes thereby to tilt the apron.

38. In a machine of the class described, the combination of means to die out articles from a sheet of plastic material, a delivery apron for receiving said articles, and means alternately to shorten and lengthen said apron to discharge the articles therefrom including a mangle rack having a guide rib, a pinion adapted to travel about said rack and be guided by said rib, and means for driving said pinion to cause the same to come and go on said rack in different planes and thereby to tilt the apron.

39. In a machine of the class described, the combination of means to die out articles from a sheet of plastic material, a delivery apron for receiving said articles, and means alternately to shorten and lengthen said apron to discharge the articles therefrom including a pinion, a mangle rack, and means for driving said pinion and causing the same to come and go on said rack in different planes and thereby to tilt the apron.

40. In a machine of the class described, the combination of means to die out articles from a sheet of plastic material, a delivery apron for receiving said articles, and means alternately to shorten and lengthen said apron to discharge the articles therefrom including a guide roll for said apron, a pinion, a mangle gear meshing with said pinion, and driving means for said pinion having provision permitting the same to move up and down in its travel to and from upper and lower runs of said mangle gear and thereby to tilt the apron.

41. In a machine of the class described, the combination of means to die out articles from a sheet of plastic material, a delivery apron for receiving said articles, and means alternately to shorten and lengthen said apron to discharge the articles therefrom including a guide roll for said apron, a pinion, a rack coöperating with said pinion having upper and lower runs; and driving means for said pinion comprising a shaft, an arm adapted to oscillate about said shaft, sprocket wheels for said pinion, shaft and arm, and sprocket chains for transmitting the drive from said sprocket wheels to said pinion.

42. In a machine of the class described, the combination of means to die out articles from a sheet of plastic material, a delivery apron for receiving said articles, means for alternately shortening and lengthening said apron to discharge the articles therefrom, a continuously advancing pan carrier for receiving the articles from said delivery apron, and driving means for said pan carrier having provision for driving the same at one speed while the delivery carrier is being shortened to deposit articles therefrom and at a more rapid rate of speed when said apron is being lengthened in readiness for another depositing operation.

43. In a machine of the class described, the combination of means to die out articles from a sheet of plastic material, a delivery apron for receiving said articles, means alternately to shorten and lengthen said delivery apron to deposit the articles therefrom, a continuously advancing pan carrier for receiving the articles from said apron, and driving means for said carrier having provision for automatically periodically advancing said carrier to a position for preventing the deposit of the articles on the edges of the pans.

44. In a machine of the class described, a carrier and driving means therefor including a differential gear mechanism and means for varying the effective action thereof comprising a cam roll having a varying cross section and means shiftable axially thereof to render a selected portion thereof effective.

45. In a machine of the class described, the combination of a pan carrier and driving means therefor including an epicylic train, a cam, a follower therefor, a means extending from said follower to a gear of said train for varying the speed transmitted therethrough.

46. In a machine of the class described, the combination of a pan carrier, and driving means therefor including a differential gear mechanism, a cam, a follower, and an adjustable link connecting said follower with said mechanism.

47. In a machine of the class described, the combination of a pan carrier; and driving means therefor including a differential gear mechanism, a heart-shaped cam, a follower for said cam and adjustable means connecting said follower with said mechanism for varying the speed imparted thereby to said carrier.

48. In a machine of the class described, the combination of a pan carrier, and driving means therefor including a differential gear mechanism, a cam, a follower, and means connecting said follower with said mechanism, said cam being formed to vary the movement of said mechanism to produce a plurality of speeds each at a uniform rate.

49. In a machine of the class described, the combination of a pan carrier with driving means therefor including a differential gear mechanism comprising driving and driven gears, a casing, a pinion carried by said casing meshing with said driving and driven gears, and means for alternately rocking said casing in opposite directions at a uniform rate to provide a plurality of uniform speeds for said carrier.

50. In a machine of the class described, the combination of a carrier with driving means therefor including a differential gear mechanism comprising driving and driven gears, a casing, a pinion carried by said casing meshing with said gears, a heart-shaped cam, a follower therefor, and means connecting said follower with said casing for alternately rocking the latter in opposite directions to vary the speed of said carrier.

51. In a machine of the class described, the combination of a carrier, driving means therefor including a differential gear mechanism, a cam, a follower, a connecting rod extending from said follower to said mechanism, and means for adjusting the length of said rod while the machine is in operation.

52. In a machine of the class described, the combination of a carrier with driving means therefor including a differential gear mechanism, a cam, a follower, a rod comprising two parts threaded together connecting said follower with said mechanism, and means for turning one of said parts to vary the effective length of said rod while the machine is in operation.

53. In a machine of the class described, the combination of a carrier with driving means therefor including a differential gear mechanism, a cam, a follower, a rod comprising two parts threaded together connecting said follower with said mechanism, and means including telescoping members for rotating one of said parts to vary the effective length of said rod while the machine is in operation.

54. In a machine of the class described, the combination of a delivery carrier, a pan carrier having lugs thereon, and means for continuously driving said pan carrier having provision for automatically alternately moving said carrier at different speeds and having provision for varying the relation of said lugs to the discharge end of said delivery carrier.

55. In a machine of the class described, the combination of a delivery apron, a pan carrier having lugs for engagement with the pans, means alternately to shorten and lengthen said delivery apron to deposit articles therefrom on to said pans, and means for continuously driving said pan carrier having provision for adjusting said pan carrier to locate the pans in positions to receive the articles from said delivery apron without striking the ends of the pans.

56. In a machine of the class described, the combination of a delivery carrier, a pan carrier having lugs thereon, and means for continuously driving said pan carrier having provision for varying the relation of said lugs with the delivery end of said apron to center batches of biscuits on the pans conveyed by said carrier.

57. In a machine of the class described, the combination of a delivery carrier, a pan carrier having lugs thereon, and means for continuously driving said pan carrier having provision for adjusting said lugs relatively to said delivery carrier to dispose the batches of biscuits on the pans conveyed by the carrier with equal margins between the batches and the ends of the pans.

58. In a machine of the class described, the combination of a pan carrier and means for continuously driving the same with intermittent relatively accelerated periods, and means to vary the duration of such periods.

59. In a machine of the class described, the combination of a pan carrier, and driving means therefor including a differential gear mechanism, a heart-shaped cam having a varying degree of eccentricity, a follower adjustable axially of said cam for varying the throw thereof, and means connecting said follower with said differential gear mechanism.

60. In a machine of the class described, the combination of a pan carrier, and driving means therefor including a differential gear mechanism, a cam having eccentric and concentric portions, a follower adjustable axially of said cam to engage with either of said portions, and means connecting said follower with said mechanism.

61. In a machine of the class described, the combination of a pan carrier and adjustable means for driving same at a uniform speed or alternating different speeds.

62. In a machine of the class described, the combination of a pan carrier with means for automatically driving the same continuously at alternating different speeds with provision for varying the duration of said speeds while the machine is in operation.

63. In a machine of the class described, the combination of a pan carrier, and driving means therefor including a differential gear mechanism, a cam member having heart shaped and cylindrical portions, a follower adjustable axially of said member to engage either of said portions, and means connecting said follower with said mechanism.

64. In a machine of the class described, the combination of a pan carrier, and driving means therefor including a differential gear mechanism, a cam member having a heart shaped portion of varying eccentricity and a concentric portion, a follower adjustable to engage either of said portions, and means connecting said follower with said mechanism.

65. In a machine of the class described, the combination of a delivery carrier, means continuously to feed the same, means alternately to shorten and lengthen the delivery end of said carrier to deposit articles therefrom, a pan carrier for receiving said articles, and means continuously to feed said pan carrier having provision for driving said carrier at one speed while receiving articles and for automatically increasing said speed to advance the forward edge of a pan ahead of said delivery carrier while the latter is advancing in readiness to deposit the articles.

66. In a machine of the class described, the combination of a cutter, means for causing the same to die out articles from a sheet of plastic material, an apron for feeding said sheet to said cutter, a scrap apron extending from a point adjacent the delivery end of the machine to a point adjacent the feeding-in end of the machine, driving means for feeding said scrap apron, and means for varying the speed of said driving means and having provision for controlling said speed adjacent the delivery end of the machine.

67. In a machine of the class described, the combination of a cutter, means for causing the same to die out articles from a sheet of plastic material, an apron for feeding said sheet to said cutter, a scrap apron extending rearwardly toward the feeding-in end of the machine, driving means for said scrap apron adjacent said feeding-in end, and means for varying the speed of said driving means having provision for controlling the same adjacent the delivery end of the machine.

68. In a machine of the class described, the combination of a cutter, means for causing the same to die out articles from a sheet of plastic material, an apron for feeding said sheet to said cutter, a scrap apron, driving means for feeding the same, means for varying the speed of said driving means including transmission connections, and a handle located adjacent the delivery end of the machine.

69. In a machine of the class described, the combination of a cutter, means for causing the same to die out articles from a sheet of plastic material, an apron for feeding said sheet to said cutter, a scrap apron, means including friction transmission gears for feeding said scrap apron, and means for adjusting one of said friction gears relatively to the other to vary the speed including transmission connections and an operating handle located adjacent the delivery end of the machine.

70. In a machine of the class described, the combination of means for feeding a sheet of plastic material with a frame; cross-heads thereon; cutters carried by one of said cross-heads, embossers carried by the other of said cross-heads; and means for adjusting said embossers relatively to said feeding means including ball and socket means.

71. In a machine of the class described, the combination of a frame with cross-heads reciprocable therein; cutter and embosser plates carried by said cross-heads; and means for adjusting one of said plates relatively to its cross-head including means permitting a universal movement.

72. In a machine of the class described, the combination of a frame with cross-heads reciprocable thereon; a cutter plate; means connecting the same with one of said cross-heads; an embosser plate; and means connecting the same with the other of said cross-heads including means having provision permitting a limited universal movement of said embosser plate.

73. In a machine of the class described, the combination of a frame with cross-heads thereon; a cutter plate; means connecting the same with one of said cross-heads; an embosser plate; and means connecting the same with said other cross-head including ball and socket connections.

74. In a machine of the class described, the combination of a frame; a cross-head thereon; a die; a support for said die and means connecting said support with said cross-head including means permitting a ball and socket movement of said support.

75. In a machine of the class described, in combination, a continuously moving delivery carrier, means to effect intermittent discharge of articles therefrom, a continuously moving pan carrier to receive articles from the delivery carrier and driving means therefor arranged to change the speed thereof in alternation with the discharging action.

76. In a machine of the class described, in combination, a continuously moving delivery carrier, means to effect intermittent discharge of articles therefrom, a continuously moving pan carrier to receive articles from the delivery carrier and driving means therefor arranged to change the speed thereof in alternation with the discharging action with a gradual acceleration and retardation.

77. In a machine of the class described, in combination, a continuously moving delivery carrier, means to effect intermittent discharge of articles therefrom, a continuously moving pan carrier to receive articles from the delivery carrier and driving means therefor arranged to change the speed thereof in alternation with the discharging action with a gradual acceleration and retardation and means to vary the rate of such acceleration.

78. In a machine of the class described, in combination, a delivery carrier and means for driving the same continuously at constant speed, cutter means to operate on the material delivery by the carrier arranged to move during the cutting operation in the same sense and at the same speed as the carrier, a continuously moving pan carrier to receive articles from said delivery carrier and driving means therefor arranged intermittently automatically to change the speed thereof with a gradual acceleration and retardation and means to vary the rate of such acceleration.

79. In a machine of the class described, the combination with flangeless gage rolls of a feeding-in trough having a bottom and sides, the latter pivoted at their outer ends and having their inner ends adjustable toward and from one another to determine the width of the dough sheet.

In testimony whereof, I have signed my name to this specification, in the presence of two subscribing witnesses.

THOMAS L. GREEN.

Witnesses:
  HENRY T. WILLIAMS,
  J. HARRY GREEN.